(12) United States Patent
Robbin et al.

(10) Patent No.: US 8,626,952 B2
(45) Date of Patent: Jan. 7, 2014

(54) INTELLIGENT INTERACTION BETWEEN MEDIA PLAYER AND HOST COMPUTER

(75) Inventors: Jeffrey L. Robbin, Los Altos, CA (US); David Heller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 165 days.

(21) Appl. No.: 12/830,234

(22) Filed: Jul. 2, 2010

(65) Prior Publication Data

US 2010/0287308 A1    Nov. 11, 2010

Related U.S. Application Data

(63) Continuation of application No. 10/277,418, filed on Oct. 21, 2002, now Pat. No. 7,765,326, which is a continuation-in-part of application No. 10/118,069, filed on Apr. 5, 2002.

(60) Provisional application No. 60/346,235, filed on Oct. 22, 2001, provisional application No. 60/396,836, filed on Jul. 16, 2002.

(51) Int. Cl.
*G06F 15/16* (2006.01)

(52) U.S. Cl.
USPC ............................ 709/248; 709/217; 381/104

(58) Field of Classification Search
None
See application file for complete search history.

(56) References Cited

U.S. PATENT DOCUMENTS

| | | | |
|---|---|---|---|
| 5,535,381 A | 7/1996 | Kooper | |
| 5,559,945 A | 9/1996 | Beaudet et al. | |
| 5,583,993 A | 12/1996 | Foster et al. | |
| 5,587,404 A | 12/1996 | Kroner et al. | |
| 5,616,876 A | 4/1997 | Cluts | |
| 5,640,566 A | 6/1997 | Victor et al. | |
| 5,666,530 A | 9/1997 | Clark et al. | |
| 5,710,922 A | 1/1998 | Alley et al. | |
| 5,721,949 A | 2/1998 | Smith et al. | |
| 5,727,202 A | 3/1998 | Kucala | |
| 5,739,451 A | 4/1998 | Winksy et al. | |
| 5,745,583 A | 4/1998 | Koizumi et al. | |

(Continued)

FOREIGN PATENT DOCUMENTS

| | | |
|---|---|---|
| EP | 0 917 077 | 5/1999 |
| EP | 0 982 732 | 3/2000 |

(Continued)

OTHER PUBLICATIONS

Bott, "Special Edition Using Microsoft 1-18 Windows Millennium Passage", Special Edition Using Microsoft Windows Millennium Edition, Nov. 3, 2000, pp. 1-24.

(Continued)

*Primary Examiner* — Backhean Tiv
(74) *Attorney, Agent, or Firm* — Novak Druce Connolly Bove + Quigg LLP

(57) ABSTRACT

Improved techniques for interaction between a host computer (e.g., personal computer) and a media player are disclosed. According to one aspect, interaction between a host computer and a media player, such as automatic synchronization of media contents stored on a media player with media contents stored on a host computer, can be restricted. According to another aspect, management of media items residing on a media player can be performed at and by a host computer for the media player. According to still another aspect, media content can be played by a media player in accordance with quality settings established for the media content at the host computer.

23 Claims, 12 Drawing Sheets

(56) References Cited

U.S. PATENT DOCUMENTS

| | | | |
|---|---|---|---|
| 5,751,997 A | 5/1998 | Kullick et al. | |
| 5,832,510 A * | 11/1998 | Ito et al. | 711/100 |
| 5,835,721 A | 11/1998 | Donahue et al. | |
| 5,835,732 A | 11/1998 | Kikinis et al. | |
| 5,845,282 A | 12/1998 | Alley et al. | |
| 5,864,868 A | 1/1999 | Contois | |
| 5,867,668 A | 2/1999 | Spirakis et al. | |
| 5,918,213 A | 6/1999 | Bernard et al. | |
| 5,918,303 A | 6/1999 | Yamaura et al. | |
| 5,923,757 A | 7/1999 | Hocker et al. | |
| 5,925,843 A | 7/1999 | Miller et al. | |
| 5,963,916 A | 10/1999 | Kaplan | |
| 5,969,283 A | 10/1999 | Looney et al. | |
| 6,000,000 A | 12/1999 | Hawkins et al. | |
| 6,006,274 A | 12/1999 | Hawkins et al. | |
| 6,038,199 A | 3/2000 | Pawlowski et al. | |
| 6,041,023 A | 3/2000 | Lakhansingh | |
| 6,061,306 A | 5/2000 | Buchheim | |
| 6,125,369 A | 9/2000 | Wu et al. | |
| 6,138,245 A | 10/2000 | Son et al. | |
| 6,172,948 B1 | 1/2001 | Keller et al. | |
| 6,178,443 B1 | 1/2001 | Lin | |
| 6,208,044 B1 | 3/2001 | Viswanadham et al. | |
| 6,216,131 B1 | 4/2001 | Liu et al. | |
| 6,243,328 B1 | 6/2001 | Fenner et al. | |
| 6,243,725 B1 | 6/2001 | Hempleman et al. | |
| 6,247,135 B1 | 6/2001 | Feague | |
| 6,248,496 B1 | 6/2001 | Galloway et al. | |
| 6,248,946 B1 | 6/2001 | Dwek | |
| 6,263,313 B1 | 7/2001 | Milsted et al. | |
| 6,272,545 B1 | 8/2001 | Flanagin et al. | |
| 6,283,764 B2 | 9/2001 | Kajiyama et al. | |
| 6,295,541 B1 | 9/2001 | Bodnar et al. | |
| 6,332,175 B1 | 12/2001 | Birrell et al. | |
| 6,338,044 B1 | 1/2002 | Cook et al. | |
| 6,341,316 B1 | 1/2002 | Kloba et al. | |
| 6,345,256 B1 | 2/2002 | Milsted et al. | |
| 6,356,971 B1 | 3/2002 | Katz et al. | |
| 6,380,947 B1 | 4/2002 | Stead | |
| 6,389,467 B1 | 5/2002 | Eyal | |
| 6,411,943 B1 * | 6/2002 | Crawford | 705/400 |
| 6,429,880 B2 | 8/2002 | Marcos et al. | |
| 6,453,281 B1 | 9/2002 | Walters et al. | |
| 6,490,432 B1 | 12/2002 | Wegener et al. | |
| 6,493,758 B1 | 12/2002 | McLain | |
| 6,523,124 B1 | 2/2003 | Lunsford et al. | |
| 6,529,804 B1 | 3/2003 | Draggon et al. | |
| 6,563,769 B1 | 5/2003 | Van Der Meulen | |
| 6,587,403 B1 | 7/2003 | Keller et al. | |
| 6,587,404 B1 | 7/2003 | Keller et al. | |
| 6,621,768 B1 | 9/2003 | Keller et al. | |
| 6,636,873 B1 | 10/2003 | Carini et al. | |
| 6,664,981 B2 | 12/2003 | Ashe et al. | |
| 6,665,803 B2 | 12/2003 | Lunsford et al. | |
| 6,694,200 B1 | 2/2004 | Naim | |
| 6,718,348 B1 | 4/2004 | Novak et al. | |
| 6,721,489 B1 | 4/2004 | Benyamin et al. | |
| 6,731,312 B2 | 5/2004 | Robbin | |
| 6,760,721 B1 | 7/2004 | Chasen et al. | |
| 6,763,345 B1 | 7/2004 | Hempleman et al. | |
| 6,779,019 B1 | 8/2004 | Mousseau et al. | |
| 6,785,542 B1 | 8/2004 | Blight et al. | |
| 6,794,566 B2 | 9/2004 | Pachet | |
| 6,801,964 B1 | 10/2004 | Mahdavi | |
| 6,831,881 B2 | 12/2004 | Patil et al. | |
| 6,874,037 B1 | 3/2005 | Abram et al. | |
| 6,925,595 B1 | 8/2005 | Whitledge et al. | |
| 6,928,433 B2 | 8/2005 | Goodman et al. | |
| 6,956,562 B1 | 10/2005 | O'Hara et al. | |
| 6,959,288 B1 | 10/2005 | Medina et al. | |
| 6,978,127 B1 | 12/2005 | Bulthuis et al. | |
| 6,987,221 B2 | 1/2006 | Platt | |
| 6,993,532 B1 * | 1/2006 | Platt et al. | 707/736 |
| 6,999,826 B1 | 2/2006 | Zhou et al. | |
| 7,010,758 B2 | 3/2006 | Bate | |
| 7,022,905 B1 | 4/2006 | Hinman et al. | |
| 7,024,214 B2 | 4/2006 | Loveland | |
| 7,024,491 B1 | 4/2006 | Hanmann et al. | |
| 7,039,656 B1 | 5/2006 | Tsai et al. | |
| 7,069,058 B2 | 6/2006 | Kawashima | |
| 7,075,000 B2 | 7/2006 | Gang et al. | |
| 7,111,009 B1 | 9/2006 | Gupta | |
| 7,130,892 B2 * | 10/2006 | Mukai | 709/219 |
| 7,136,934 B2 | 11/2006 | Carter et al. | |
| 7,146,322 B2 | 12/2006 | Cowgill | |
| 7,194,692 B2 | 3/2007 | Marcos et al. | |
| 7,281,141 B2 | 10/2007 | Elkayam et al. | |
| 7,283,880 B2 | 10/2007 | Dick | |
| 7,295,983 B2 | 11/2007 | Fujiwara et al. | |
| 7,471,988 B2 | 12/2008 | Smith et al. | |
| 7,627,808 B2 * | 12/2009 | Blank et al. | 715/200 |
| 7,647,346 B2 | 1/2010 | Silverman et al. | |
| 7,680,849 B2 * | 3/2010 | Heller et al. | 707/621 |
| 7,765,326 B2 * | 7/2010 | Robbin et al. | 709/248 |
| 7,769,903 B2 * | 8/2010 | Robbin et al. | 709/248 |
| 7,797,446 B2 * | 9/2010 | Heller et al. | 709/242 |
| 2001/0004310 A1 | 6/2001 | Kono | |
| 2001/0011308 A1 | 8/2001 | Clark et al. | |
| 2001/0018858 A1 | 9/2001 | Dwek | |
| 2001/0021053 A1 | 9/2001 | Colbourne et al. | |
| 2001/0041021 A1 | 11/2001 | Boyle et al. | |
| 2001/0044835 A1 | 11/2001 | Schober et al. | |
| 2001/0048642 A1 | 12/2001 | Berhan | |
| 2001/0052123 A1 | 12/2001 | Kawai | |
| 2002/0002413 A1 | 1/2002 | Tokue | |
| 2002/0013784 A1 | 1/2002 | Swanson | |
| 2002/0045960 A1 * | 4/2002 | Phillips et al. | 700/94 |
| 2002/0046315 A1 | 4/2002 | Miller et al. | |
| 2002/0055934 A1 | 5/2002 | Lipscomb et al. | |
| 2002/0073139 A1 | 6/2002 | Hawkins et al. | |
| 2002/0078075 A1 * | 6/2002 | Colson et al. | 707/204 |
| 2002/0095663 A1 | 7/2002 | Joory | |
| 2002/0113824 A1 | 8/2002 | Myers | |
| 2002/0116082 A1 | 8/2002 | Gudorf | |
| 2002/0118848 A1 | 8/2002 | Karpenstein | |
| 2002/0133515 A1 | 9/2002 | Kagle et al. | |
| 2002/0138606 A1 | 9/2002 | Robison | |
| 2002/0156921 A1 | 10/2002 | Dutta | |
| 2002/0161865 A1 | 10/2002 | Nguyen | |
| 2002/0174243 A1 | 11/2002 | Spurgat et al. | |
| 2002/0174269 A1 | 11/2002 | Spurgat et al. | |
| 2002/0194309 A1 | 12/2002 | Carter et al. | |
| 2003/0013493 A1 | 1/2003 | Irimajiri et al. | |
| 2003/0030733 A1 | 2/2003 | Seaman et al. | |
| 2003/0037254 A1 | 2/2003 | Fischer et al. | |
| 2003/0046434 A1 | 3/2003 | Flanagin et al. | |
| 2003/0050058 A1 | 3/2003 | Walsh et al. | |
| 2003/0065802 A1 | 4/2003 | Vitikainen et al. | |
| 2003/0074457 A1 | 4/2003 | Kluth | |
| 2003/0076301 A1 | 4/2003 | Tsuk | |
| 2003/0079038 A1 | 4/2003 | Robbin et al. | |
| 2003/0097379 A1 | 5/2003 | Ireton | |
| 2003/0112279 A1 | 6/2003 | Irimajiri | |
| 2003/0158737 A1 | 8/2003 | Csicsatka | |
| 2003/0167318 A1 | 9/2003 | Robbin et al. | |
| 2003/0182315 A1 | 9/2003 | Plastina et al. | |
| 2003/0191756 A1 | 10/2003 | Oh | |
| 2003/0197725 A1 | 10/2003 | Tuli | |
| 2003/0210821 A1 | 11/2003 | Yogeshwar et al. | |
| 2003/0221541 A1 | 12/2003 | Platt | |
| 2004/0001395 A1 | 1/2004 | Keller et al. | |
| 2004/0001396 A1 | 1/2004 | Keller et al. | |
| 2004/0003151 A1 | 1/2004 | Bateman et al. | |
| 2004/0004338 A1 | 1/2004 | Benliyan | |
| 2004/0017997 A1 | 1/2004 | Cowgill | |
| 2004/0027930 A1 | 2/2004 | Kudo | |
| 2004/0055446 A1 | 3/2004 | Robbin et al. | |
| 2004/0068536 A1 * | 4/2004 | Demers et al. | 709/201 |
| 2004/0076086 A1 | 4/2004 | Keller et al. | |
| 2004/0078416 A1 | 4/2004 | Kawasaki et al. | |
| 2004/0128198 A1 | 7/2004 | Register et al. | |
| 2004/0139180 A1 | 7/2004 | White et al. | |
| 2004/0139844 A1 | 7/2004 | Tsuboi | |
| 2004/0193900 A1 | 9/2004 | Nair | |

(56) References Cited

U.S. PATENT DOCUMENTS

| | | | |
|---|---|---|---|
| 2004/0216108 A1 | 10/2004 | Robbin | |
| 2004/0225762 A1 | 11/2004 | Poo | |
| 2004/0236568 A1 | 11/2004 | Giuillen et al. | |
| 2004/0242224 A1 | 12/2004 | Janik et al. | |
| 2004/0252400 A1* | 12/2004 | Blank et al. | 360/70 |
| 2004/0252604 A1 | 12/2004 | Johnson et al. | |
| 2004/0267825 A1 | 12/2004 | Novak et al. | |
| 2005/0010616 A1 | 1/2005 | Burks | |
| 2005/0055444 A1 | 3/2005 | Venkatasubramanian | |
| 2005/0080915 A1 | 4/2005 | Shoemaker | |
| 2005/0102329 A1 | 5/2005 | Jiang et al. | |
| 2005/0147130 A1 | 7/2005 | Hurwitz et al. | |
| 2005/0235015 A1* | 10/2005 | Abanami et al. | 707/204 |
| 2005/0240494 A1 | 10/2005 | Cue et al. | |
| 2005/0240661 A1 | 10/2005 | Heller et al. | |
| 2005/0262528 A1 | 11/2005 | Herley et al. | |
| 2006/0027080 A1 | 2/2006 | Schultz | |
| 2006/0090202 A1 | 4/2006 | Liu et al. | |
| 2006/0100978 A1 | 5/2006 | Heller et al. | |
| 2006/0106806 A1 | 5/2006 | Sperling | |
| 2006/0143455 A1 | 6/2006 | Gitzinger | |
| 2006/0159109 A1 | 7/2006 | Lamkin et al. | |
| 2006/0168340 A1 | 7/2006 | Heller et al. | |
| 2006/0168351 A1 | 7/2006 | Ng | |
| 2006/0224620 A1 | 10/2006 | Silverman et al. | |
| 2006/0230081 A1 | 10/2006 | Craswell | |
| 2006/0265409 A1 | 11/2006 | Neumann et al. | |
| 2006/0265503 A1 | 11/2006 | Jones | |
| 2006/0288057 A1* | 12/2006 | Collins et al. | 707/204 |
| 2007/0033052 A1 | 2/2007 | Cowgill | |
| 2007/0038941 A1 | 2/2007 | Wysocki et al. | |
| 2007/0067309 A1 | 3/2007 | Klein et al. | |
| 2007/0073723 A1 | 3/2007 | Ramer et al. | |
| 2007/0073728 A1 | 3/2007 | Klein et al. | |
| 2007/0074118 A1 | 3/2007 | Robbin et al. | |
| 2007/0084333 A1 | 4/2007 | Robbin et al. | |
| 2007/0088727 A1 | 4/2007 | Kindig | |
| 2007/0088764 A1 | 4/2007 | Yoon et al. | |
| 2007/0124680 A1 | 5/2007 | Robbin et al. | |
| 2007/0130541 A1* | 6/2007 | Louch et al. | 715/804 |
| 2007/0185919 A1 | 8/2007 | Kaplan et al. | |
| 2007/0203954 A1 | 8/2007 | Vargas et al. | |
| 2007/0220552 A1 | 9/2007 | Juster et al. | |
| 2007/0271312 A1* | 11/2007 | Heller et al. | 707/201 |
| 2007/0291323 A1 | 12/2007 | Roncal | |
| 2008/0018927 A1* | 1/2008 | Martin et al. | 358/1.15 |
| 2008/0028008 A1 | 1/2008 | Brunet et al. | |
| 2008/0086494 A1 | 4/2008 | Heller et al. | |
| 2008/0168185 A1* | 7/2008 | Robbin et al. | 709/248 |
| 2008/0168245 A1* | 7/2008 | De Atley et al. | 711/162 |
| 2008/0168391 A1* | 7/2008 | Robbin et al. | 715/810 |
| 2008/0168525 A1* | 7/2008 | Heller et al. | 725/139 |
| 2008/0168526 A1* | 7/2008 | Robbin et al. | 725/139 |
| 2009/0290725 A1 | 11/2009 | Huang | |
| 2010/0232771 A1* | 9/2010 | Prestenback et al. | 386/126 |
| 2011/0066746 A1* | 3/2011 | Bennett et al. | 709/231 |

FOREIGN PATENT DOCUMENTS

| | | |
|---|---|---|
| EP | 1 028 425 | 8/2000 |
| EP | 1 353 269 A | 10/2003 |
| EP | 1408427 A2 | 4/2004 |
| EP | 1 429 569 A | 6/2004 |
| EP | 1 548 740 | 6/2005 |
| JP | H07-509333 | 10/1995 |
| JP | H09-223060 | 8/1997 |
| JP | 2000-339917 | 12/2000 |
| JP | 2001-93226 | 4/2001 |
| JP | 2001-117800 | 4/2001 |
| JP | 2003-077214 | 3/2003 |
| JP | 2003-303137 | 10/2003 |
| JP | 2003-319485 | 11/2003 |
| KR | 10-2001-0063284 | 7/2001 |
| KR | 10-2001-0063284 A | 7/2001 |
| KR | 10-2001-0079176 A1 | 8/2001 |
| KR | 10-2002-0011027 | 2/2002 |
| KR | 10-2002-0011027 A | 2/2002 |
| KR | 10-2006-0035634 | 12/2004 |
| KR | 10-2006-0035634 A | 4/2006 |
| KR | 10-0599204 B1 | 7/2006 |
| WO | WO 94/08337 | 4/1994 |
| WO | WO 95/16950 | 6/1995 |
| WO | WO 00/43914 A1 | 7/2000 |
| WO | WO 01/33569 | 5/2001 |
| WO | WO 01/55889 | 8/2001 |
| WO | WO 01/67753 | 9/2001 |
| WO | WO 02/25610 | 3/2002 |
| WO | WO 02/25935 | 3/2002 |
| WO | WO 03/023786 | 3/2003 |
| WO | WO 03/036541 | 5/2003 |
| WO | WO 2004-004338 | 1/2004 |
| WO | WO 2004/034286 A1 | 4/2004 |
| WO | WO 2004/057474 | 7/2004 |
| WO | WO 2004/084413 | 9/2004 |
| WO | WO 2005/060387 A2 | 7/2005 |
| WO | WO 2005-114472 A1 | 12/2005 |
| WO | WO 2006/047578 A2 | 5/2006 |

OTHER PUBLICATIONS

"SyncML Data Sync Protocol version 1.1.2" Open Mobile Alliance, Jun. 12, 2003, 1-63 pgs.

Extended European Search Report for EP Patent Application No. 10182032.2, dated Jul. 15, 2011.

"Apple Announces iTunes 2," Press Release, Apple Computer, Inc., Oct. 23, 2001.

"Apple Introduces iTunes—World's Best and Easiest To Use Jukebox Software," Macworld Expo, San Francisco, Jan. 9, 2001.

"Digital Still Cameras—Downloading Images to a Computer," Mimi Chakarova et al., Multi-Media Reporting and Convergence, Jan. 18, 2006, 2 pgs.

"Hewlett Packard Jornada 525 Color Pocket PC," downloaded Jan. 25, 2002, http://www.pc4d.com/electronics/products/56/jornada_525_color_pocket_pc.shtml.

"Nomad Jukebox," User Guide, Creative Technology Ltd., Version 1, Aug. 2000.

"Rio Portable Music Player," Web Review, downloaded Jan. 25, 2002, http://www.webreviews.com/9901/rio.html.

"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.

"About MusicMatch Jukebox," MusicMatch Jukebox v4 Help, pp. 1-4, (1999).

Adam C. Engst, "SoundJam Keeps on Jammin'," Jun. 19, 2000, available from http://db.tidbits.com/getbits.acgi?tbart=05988.

Alicia Awbrey, press release entitled "Apple's iPod Available in Stores Tomorrow," Nov. 9, 2001.

Andrew Birrell, "Personal Jukebox (PJB)," Oct. 13, 2000 available from http://birrell.org/andrew/talks/pjb-overview.ppt.

Andy Lindauer, "What's in your Pocket?," Edgereview, downloaded Jan. 25, 2002, http://www.edgereview.com/print.cfm?Type=aag&ID=286.

Bridgman, "Windows XP Expert Zone Community Columist", Using Windows Mobile-based Portable Media Centers and Windows Media Player 10, Aug. 25, 2004, 1-11.

Combined Search and Examination Report re: GB Application No. 0425738.2, dated Dec. 21, 2004.

Combined Search and Examination Report re: GB Application No. 0425740.8, dated Dec. 21, 2004.

Combined Search and Examination Report re: GB Application No. 0425742.4, dated Dec. 21, 2004.

Compaq Computer Corp., copyright 1991, Personal Jukebox User Manual, pp. 1-29.

Compaq, "Personal Jukebox," Jan. 24, 2001, available from http://research.compaq.com/SRC/pjb/, 3 pgs.

De Herrera, Chris, "Microsoft ActiveSync 3.1," Version 1.02, Oct. 13, 2000.

(56) References Cited

OTHER PUBLICATIONS

Etchison, "Accelerated Discrete Adjustment of the Parameters of a Process", IBM Technical Disclosure Bulletin, vol. 15, No. 5, Oct. 1, 1972, 2 pgs.
Examination Report re: GB Application No. 0314394.8, dated Aug. 12, 2003.
Examination Report re: GB Application No. 0314394.8, dated Mar. 2, 2004.
Examination Report re: GB Application No. 0425738.2, dated Sep. 15, 2005.
Examination Report re: GB Application No. 0425740.8, dated Sep. 16, 2005.
Examination Report re: GB Application No. 0425742.4, dated Sep. 19, 2005.
Firewire, IEEE 1394 (also known as Sony's iLink), (http://www.wikipedia.org/wild/Firewire (1995)).
Glenn Fleishman, "Handheld iPod joins MP3 band a bit late, but is standout player," Nov. 6, 2001, http://seattletimes.nwsource.com/html/businesstechnology/134361811_ptmacc040.html.
Handbook for Palm™ m500 Series Handhelds, User Manual, copyright 1998-2001.
Iriver, "PMP140/120", Sep. 13, 2004, 1-2 pgs.
iTunes 2, Playlist Related Help Screens, iTunes v2.0, Apple Computer, Inc., Oct. 23, 2001.
MG-25, Portable MPEG4 Player (MG-25), Jul. 29, 2004, 1-3 pgs.
iTunes, Digital Music for your Mac, Apple Computer, Inc., downloaded Oct. 22, 2001, http://www.apple.com/itunes/.
iTunes, Playlist Related Help Screens, iTunes v1.0, Apple Computer, Inc., Jan. 2001.
JP0 Office Action re: JP Application No. 2003-538957, dated Aug. 29, 2006 (with translation).
JP0 Office Action re: JP Application No. 2003-538957, dated Mar. 27, 2007 (with translation).
JP0 Office Action re: JP Application No. 2003-538957, dated Oct. 16, 2007 (with translation).
Lyra, Personal Digital Player, RCA, Product Box. (2003).
Miniman, "Applian Software's Replay Radio and Player v1.02," Product review, pocketnow.com, http://www.pocketnow.com/reviews/replay/replay.htm, Jul. 31, 2001.
Musicmatch, "Musicmatch and Xing Technology Introduce Musicmatch Jukebox," May 5, 1998, available from http://www.musicmatch.com/info/company/press/releases/?year=1998&release=2.
Nutzel et al., "Sharing Systems for Future HiFi Systems", Proceedings of the Fourth International Conference on Web Delivering of Music, Sep. 13, 2008, 8 pgs.
Office Action from European Patent Office for European Patent Application No. 02778609.4 dated Oct. 12, 2004.
Office Action from European Patent Office for European Patent Application No. 02778609.4 dated Oct. 31, 2005.
Office Action from UK Patent Office for UK Patent Application No. GB0425740.8 dated Dec. 21, 2004.
Personal Jukebox (PJB), "Systems Research Center and PAAD," Compaq Computer Corp., Oct. 13, 2000, http://research.compaq.com/SRC/pjb/.
RCA Lyra User's Guide, RD2201/2202/2204, www.lyrazone.com, pp. 1-37, (1999).
RealJukebox Plus Manual, Real Networks, Inc., copyright 1999, pp. 1-83, RealJukebox, Real Networks, Inc., webpages downloaded Oct. 27, 2005 http://www.real.com/Jukebox/release_notes.html#.
Replay Gain, "Replay Gain—A proposed Standard," Oct. 7, 2001, available from http://replaygain.hydrogenaudio.org/index.html and http://replaygain.hydrogenaudio.org/outline.html.
Sinitsyn, "A Synchronization Framework for Personal Mobile Servers," Proceedings of the Second IEEE Annual Conference on Pervasive Computing and Communications Workshops, Piscataway, NJ, Mar. 14, 2004, pp. 1-4.
SoundJam MP Plus, Representative Screens, published by Casady & Greene, Inc., Salinas, CA 2000.
Specification Sheet, iTunes 2, Apple Computer, Inc., Oct. 31, 2001.
Steinberg, "Sonicblue Rio Car," Product Review, Dec. 12, 2000, http://electronics.cnet.com/electronics/0-6342420-1304-4098389.html.
Travis Butler, "Archos Jukebox 6000 Challenges Nomad Jukebox," Aug. 13, 2001, available from http://db.tidbits.com/getbits.acgi?tbart=06521.
Travis Butler, "Portable MP3: The Nomad Jukebox," Jan. 8, 2001, available from http://db.tidbits.com/getbits.acgi?tbart=06261.
TuneBase 100 User Guide, A CD Library Management System, Escient, Inc. copyright 1999.
TuneBase Pro Mk-II User's Guide, Escient, Inc., (1999).
U.S. Appl. No. 10/936,233, entitled "Method and system for dynamically populating groups in a developer environment", filed Sep. 7, 2004.
U.S. Appl. No. 11/238,587, entitled "Graphical user interface and methods of use thereof in a multimedia player", filed Sep. 28, 2005.
U.S. Appl. No. 11/679,082, entitled "Data Synchronization with Host Device in Accordance with Synchronization Preferences", filed Feb. 26, 2007.
U.S. Appl. No. 11/679,091, entitled "Background Data Transmission between Media Device and Host Device", filed Feb. 26, 2007.
U.S. Appl. No. 11/679,114, entitled "Data Backup for Mobile Device", filed Feb. 26, 2007.
U.S. Appl. No. 11/757,204, entitled "Intelligent synchronization of media player with host computer", filed Jun. 1, 2007.
U.S. Appl. No. 11/757,214, entitled "Intelligent synchronization of media player with host computer", filed Jun. 1, 2007.
U.S. Appl. No. 11/767,443, entitled "Widget Synchronization in Accordance with Synchronization Preferences", filed Jun. 22, 2007.
U.S. Appl. No. 11/830,645, entitled "Multiple media type synchronization between host computer and media device", filed Jul. 30, 2007.
Vetro et al., "Media Conversions to Support Mobile Users," IEEE Canadian Conference on Electrical and Computer Engineering, Piscataway, NJ, May 13, 2001, pp. 607-612.
Wikipedia: "iTunes", www.wikipedia.com, May 9, 2005, 6 pages.
Window's Media Player 6.4, Microsoft Corp., copyright 1999, software available at http://www.oldversion.com/program.php?n=wmp See also Windows Media Player 6.4 Software Official website at http://www.microsoft.com/windows/windowsmedia/player/version64/default.aspx.
Zheng et al., "MobiGATE: a mobile gateway proxy for the active deployment of transport entities," Proceedings of the 2004 International Conference on Parallel Processing, Piscataway, NJ, Aug. 15, 2004.
"Diamond Multimedia Announces Rio PMP300 Portable MP3 Music Player", Press Release, http://news.harmony-central.com/Newp/1998/Rio-PMP300.html, Sep. 14, 1998, 4 pgs.
M. Nilsson; ID3 tag version 2.3.0; Feb. 3, 1999, http://www.id3lib.org/id3v2.3.0.html.
M. Nilsson; IDS tag verions 2.4.0—Main Structure; Nov. 1, 2000; http://www.id3.org/id3v2.4.0-structure.
Hei et al., "iPod+iTunes", Markt+Technick Verlang, Dec. 22, 2006.
"iPod +iTunes", Markt+Technick Verlang, 2007.
Erdmann et al., "iPod + iTunes", O'Reilly, 2006.
"Pocket PC Phone User Manual", High Tech Computer Corp., 2006.
Skarlatos et al., "Sprite Software Sprite Backup 5.0", Internet Publication, www.pocketnow.com/index.php?a+portal_print&t=review &id=788, Mar. 6, 2005.
Office Action for U.S. Appl. No. 10/118,069, mailed Jun. 27, 2005.
Office Action for U.S. Appl. No. 10/118,069, mailed Nov. 30, 2005.
Office Action for U.S. Appl. No. 10/118,069, mailed Jul. 5, 2006.
Office Action for U.S. Appl. No. 10/118,069, mailed Jan. 12, 2007.
Office Action for U.S. Appl. No. 10/118,069, mailed Sep. 12, 2007.
Office Action for U.S. Appl. No. 10/118,069, mailed Feb. 8, 2008.
Office Action for U.S. Appl. No. 10/118,069, mailed Aug. 18, 2008.
Office Action for U.S. Appl. No. 10/118,069, mailed Jan. 12, 2009.
Office Action for U.S. Appl. No. 10/118,069, mailed Aug. 10, 2009.
Office Action for U.S. Appl. No. 10/277,418, mailed Jul. 5, 2006.
Office Action for U.S. Appl. No. 10/277,418, mailed Jan. 22, 2007.
Office Action for U.S. Appl. No. 10/277,418, mailed Jun. 22, 2007.
Office Action for U.S. Appl. No. 10/277,418, mailed Dec. 5, 2007.
Office Action for U.S. Appl. No. 10/277,418, mailed Jun. 26, 2008.

(56) References Cited

OTHER PUBLICATIONS

Office Action for U.S. Appl. No. 10/277,418, mailed Jan. 14, 2009.
Office Action for U.S. Appl. No. 10/277,418, mailed May 8, 2009.
Office Action for U.S. Appl. No. 11/757,204, mailed Aug. 18, 2009.
Office Action for U.S. Appl. No. 11/757,214, mailed Dec. 19, 2008.
Office Action for U.S. Appl. No. 11/757,214, mailed May 26, 2009.
Office Action for U.S. Appl. No. 11/757,214, mailed Nov. 16, 2009.
Apple Inc., "Apple-Downloads-Dashboard", http://www.apple.com/downloads/dashboard, downloaded Dec. 16, 2008, pp. 1-2.
GUI Widget, Wikipedia.org., http://en.wikipedia.org.wiki/Widget_(computing), downloaded Dec. 29, 2008, pp. 1-2.
Office Action for Japanese Patent Application No. 2007-166968, mailed Feb. 12, 2010.
Office Action for Australian Patent Application No. 2007202654 dated Jan. 27, 2009.
Office Action for Japanese Patent Application No. 2003-538957, mailed Jun. 17, 2008.
Office Action for Japanese Patent Application No. 2007-166968 mailed Feb. 23, 2010.
Notice of Preliminary Rejection for Korean Patent Application No. 10-2004-7005816, mailed May 12, 2006.
Office Action for Canadian Patent Application No. 2,464,102 dated Feb. 8, 2010.
Top Stores of Dec. 18, 2001: Apple posts Automated Scripts for iTunes 2.03. pp. 11, obtained from the internet at: http://www.xlr8yourmac.com.
iTunes-perl, copyright 2004-2006 by Jay McGavren, obtained from the Internet at http://code.google.com, pp. 7.
Pocket Tunes 5.0.0, copyright 2002-2009 Normsoft, Inc., pp. 1-25, obtained from the Internet at: http://www.pocket-tunes.com.
"Perfect guide for digital/audio technique to enjoy music in PC", Nobuya Fukuda, published in "Nikkei Click", Japan, Nikkei business Publications, Inc., Sep. 8, 1999, vol. 6/No. 10, p. 169.
Summons at attend Oral Proceedings for EP Patent Application No. 10182032.2 mailed May 29, 2013.
Examination Report for European Patent Application No. 10182032.2, dated Apr. 23, 2012.
Decision of Rejection for Japanese Patent Application No. 2007-166968, dated Jul. 31, 2012.
Summons to Attend Oral Proceedings for European Patent Application No. 02778609.4, dated Apr. 10, 2012.
Decision to Refuse a European Patent Application for European Patent Application No. 02778609.4, dated Oct. 15, 2012.
Official Action for Canadian Patent Application No. 2,464,102, dated Feb. 29, 2012.

* cited by examiner

INTELLIGENT INTERACTION BETWEEN MEDIA PLAYER AND HOST COMPUTER

CROSS-REFERENCE TO RELATED APPLICATIONS

This application is a continuation of U.S. application Ser. No. 10/277,418, filed Oct. 21, 2002 now U.S. Pat. No. 7,765,326, and entitled "INTELLIGENT INTERACTION BETWEEN MEDIA PLAYER AND HOST COMPUTER," which is hereby incorporated herein by reference, and which in turn is a continuation-in-part of U.S. application Ser. No. 10/118,069, filed Apr. 5, 2002, and entitled "INTELLIGENT SYNCHRONIZATION OF MEDIA PLAYER WITH HOST COMPUTER," which is hereby incorporated herein by reference, and which claimed the benefit of priority of U.S. Provisional Application No. 60/346,235, filed Oct. 22, 2001, and entitled "INTELLIGENT SYNCHRONIZATION OF MEDIA PLAYER WITH HOST COMPUTER," which is hereby incorporated herein by reference.

U.S. application Ser. No. 10/277,418 also claims the benefit of priority of: (i) U.S. Provisional Application No. 60/396,836, filed Jul. 16, 2002, and entitled "INTELLIGENT INTERACTION BETWEEN MEDIA PLAYER AND HOST COMPUTER," which is hereby incorporated herein by reference; and (ii) U.S. Provisional Application No. 60/346,235, filed Oct. 22, 2001, and entitled "INTELLIGENT SYNCHRONIZATION OF MEDIA PLAYER WITH HOST COMPUTER," which is hereby incorporated herein by reference.

BACKGROUND OF THE INVENTION

1. Field of the Invention

The present invention relates to media devices and, more particularly, to synchronization or management of media on media devices.

2. Description of the Related Art

Synchronization operations have been conventionally performed between portable devices, such as Personal Digital Assistants (PDAs) and host computers, to synchronize electronic files or other resources. For example, these files or other resources can pertain to text files, data files, calendar appointments, emails, to-do lists, electronic rolodexes, etc. However, such synchronization schemes tend to utilize filenames and modification dates to determine whether files need to be copied between the devices. These synchronization schemes can be largely automated but nevertheless have to be manually initiated.

In the case of media players, such as MP3 players, files are typically moved between a host computer and a media player through use of a drag and drop operation, like is conventionally done with respect to copying of a data file from a Windows desktop to a floppy disk. Hence, the user of the media player manually initiates the synchronization for individual media items. As a consequence, synchronization tends to be tedious and time consuming for users. Synchronization tends to be slow because data is transmitted between devices over a slow link.

Besides synchronization, management of resources on these portable devices has also been separately performed. For example, a user of a PDA can enter an appointment or a new contact using only the PDA, and then subsequently a host computer could, if desired, be updated (through synchronization) to include identical information. A user can also interact with the host computer to change appointments or contacts, and then subsequently have those changes be reflected on the PDA (through synchronization). As for interaction with the portable devices (e.g., PDAs), the portable devices normally are small form factor devices so as to be hand-held or pocket-size. Although their small size makes the portable devices convenient to carry, it makes the available screen display size small. Consequently, it is difficult for user to interact with the portable devices to manage resources thereon.

Thus, there is a need for improved techniques for improved approaches to synchronize or manage media content on host computers and/or media players.

SUMMARY OF THE INVENTION

Broadly speaking, the invention relates to interaction between a host computer (e.g., personal computer) and a media player. According to one aspect of the invention, interaction between a host computer and a media player, such as automatic synchronization of media contents stored on a media player with media contents stored on a host computer, can be restricted. In one implementation, a given media player is able to automatically interact only with a designated host computer. According to another aspect of the invention, management of media items residing on a media player can be performed at and by a host computer for the media player. According to still another aspect of the invention, media content can be played by a media player in accordance with quality settings established for the media content at the host computer. In one implementation, the quality settings can be established for the media content on a media item by media item basis.

The invention can be implemented in numerous ways, including as a method, system, device, apparatus, or computer readable medium. Several embodiments of the invention are discussed below.

According to one embodiment, a method can perform synchronization of media items of a portable media player with a host computer and subsequent playback of one or more of the media items on the media player. The media player can store player media information, and the host computer can store host media information. The method can, for example, determine whether synchronization of the media player with the host computer should be performed. Synchronization of the media player with the host computer can then be performed when it is determined that synchronization of the media player with the host computer should be performed. The synchronization can transfer one or more media items to the media player from the host computer, whereby for the one or more media items being transferred, media item data is received at the media player via a first electronic file and stored in a media store at the media player, and media information data is received at the media player via a second electronic file and stored in a media database at the media player. The media information data can include at least one quality characteristic, and the at least one quality characteristic includes at least one or more user-specified equalization settings. The method can also subsequently receive a playback request to play an identified one of the media items, and configure the media player to play the identified one of the media items. For example, the media player can be configured to play the identified one of the media items in accordance with at least one of the one or more user-specified equalization settings corresponding thereto.

According to another embodiment, a computer readable storage medium can include at least executable computer program code stored thereon for performing synchronization of media items of a media player with a host computer and subsequent playback of one or more of the media items on the media player. The media player can store player media information, and the host computer can store host media information. The computer readable storage medium can, for example, include computer program code for determining whether synchronization of the media player with the host computer should be performed, and computer program code for synchronizing the media player with the host computer if the computer program code for determining determines that synchronization of the media player with the host computer should be performed, wherein the computer program code for synchronizing transfers one or more media items to the media player from the host computer. For the one or more media items being transferred, media item data and media information data are received at the media player and stored at the media player. The media information data can include at least one quality characteristic, and the at least one quality characteristic can include at least one or more user-specified equalization settings. The computer readable storage medium can also include computer program code for subsequently receiving a playback request to play an identified one of the media items, and computer program code for configuring the media player to play the identified one of the media items, where the media player can be configured to play the identified one of the media items in accordance with at least one of the one or more user-specified equalization settings corresponding thereto.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to interaction between a host computer (e.g., personal computer) and a media player. According to one aspect of the invention, interaction between a host computer and a media player, such as automatic synchronization of media contents stored on a media player with media contents stored on a host computer, can be restricted. In one implementation, a given media player is able to automatically interact only with a designated host computer. According to another aspect of the invention, management of media items residing on a media player can be performed at and by a host computer for the media player. According to still another aspect of the invention, media content can be played by a media player in accordance with quality settings established for the media content at the host computer. In one implementation, the quality settings can be established for the media content on a media item by media item basis.

Embodiments of these aspects of the invention are discussed below with reference to FIGS. 1-11. However, those skilled in the art will readily appreciate that the detailed description given herein with respect to these figures is for explanatory purposes as the invention extends beyond these limited embodiments.

Figure 1:
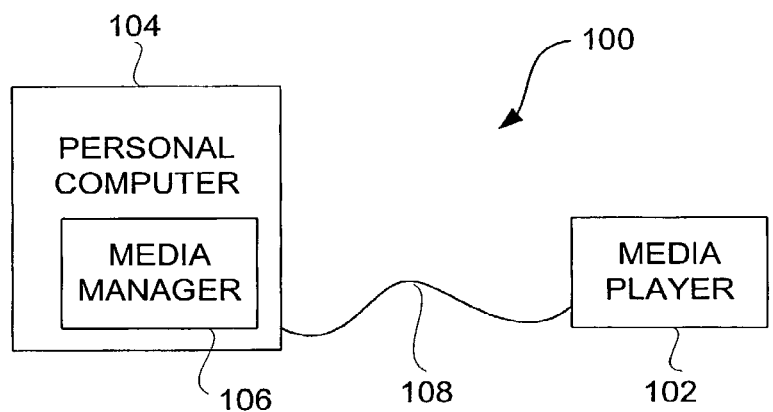
FIG. 1 is a block diagram of a media management system according to one embodiment of the invention.

FIG. 1 is a block diagram of a media management system 100 according to one embodiment of the invention. The media management system 100 includes a media player 102 and a personal computer (host computer) 104. The media player 102 is, for example, a portable, battery-operated device. In one embodiment, the media player 102 is an MP3 player. The personal computer 104 includes a media manager 106. The media manager 106 enables a user of the personal computer 104 to directly manage media content stored on the personal computer 104, and to indirectly manage media content stored on the media player 102. A peripheral cable 108 couples the media player 102 to the personal computer 104. Typically, the peripheral cable 108 couples together data ports provided on the media player 102 and the personal computer 104. In one example, the data ports can be FIREWIRE ports and the peripheral cable 108 can be a FIREWIRE cable. More generally, the peripheral cable 108 acts as a data link. Media items can be transferred from the media player 102 to the personal computer 104 over the peripheral cable 108, and vice versa. For example, the media manager 106 facilitates a user with browsing, adding, deleting, organizing, and other operations with respect to media content (e.g., numerous media items) on the personal computer 104. Additionally, for example, the media manager 106 also facilitates a user with adding and removing media content on the media player 102. In other words, although the media manager 106 resides on the personal computer 104, at least certain management action taken with respect to the media manager 106 can cause the media content at the media player 102 to be similarly managed (e.g., during synchronization).

In one embodiment, the media player is a portable computing device dedicated to processing media such as audio, video or images. For example, the media player 102 can be a music player (e.g., MP3 player), a game player, a video player, a video recorder, a camera, an image viewer and the like. These devices are generally battery operated and highly portable so as to allow a user to listen to music, play games or video, record video or take pictures wherever the user travels. In one implementation, the media player is a hand-held device that is sized for placement into a pocket or hand of the user. By being hand-held, the media player is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, the device may be operated by the users hands, no reference surface such as a desktop is needed.

Figure 2:
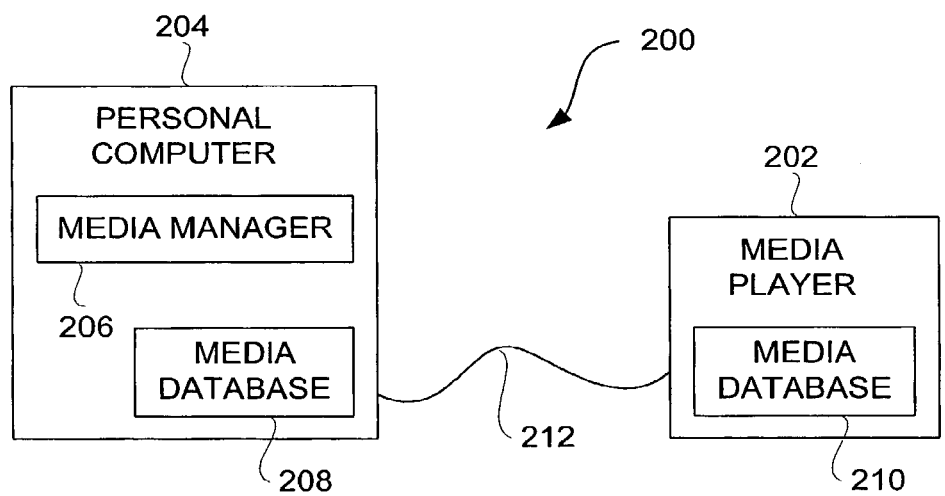
FIG. 2 is a block diagram of a media synchronization system according to one embodiment of the invention.

FIG. 2 is a block diagram of a media synchronization system 200 according to one embodiment of the invention. The media synchronization system 200 can, for example, represent one embodiment of the more general media management system 100 illustrated in FIG. 1. The media synchronization system 200 includes a media player 202 and a personal computer 204. The personal computer 204 includes a media manager 206. The personal computer 204 further includes a media database 208. The media player 202 includes a media database 210. Typically, the media player 202 will also include a data storage device (e.g., disk drive) for storing media content, a cache memory for storing media content in-use, a screen display for displaying information to a user, and a processor (e.g., microprocessor) for controlling operation of the media player 202.

A peripheral cable 212 provides a data path (or data link) between the media player 202 and the personal computer 204. The peripheral cable 212 provides a peripheral bus that couples the media player 202 to the personal computer 204. The peripheral bus, for example, could be a FIREWIRE bus or a Universal Serial Bus (USB). A synchronization operation between the media content stored on the personal computer and the media content stored on the media player 204 can be achieved in a sophisticated manner through comparison of media information stored in the respective media databases 208 and 210. When comparison of the media information from the respective databases 208 and 210 indicates that there is a particular media item resident on the personal computer 204 that is not resident on the media player 202, then the particular media item can be transmitted (downloaded) to the media player over the peripheral cable 212. On the other hand, when the comparison of the media information from the respective databases 208 and 210 indicates that a particular media item is resident on the media player 202 but is not resident on the personal computer 204, then the particular media item can be either removed (deleted) from the media player 202 or transmitted (e.g., uploaded) over the peripheral cable 212 to the personal computer 204. Hence, by providing the media player 202 with the media database 210, more sophisticated synchronization and management of media content is enabled.

The media database 210 also allows the media player 202 to present a user interface to the user that is more sophisticated than conventional approaches. Such a user interface can be presented on the screen display of the media player 202. The user interface can, for example, allow the user of the media player 202 to browse, sort, search, play, etc. the media content resident on the media player 202. The user interface can also allow the user of the media player 202 to download (add) or delete (remove) media items from the media player 202. The media manager 206 also has a user interface that allows a user to browse, sort, search, play, make playlists, burn Compact Discs (CDs), etc. the media content resident on the personal computer 204. The user interface can also allow the user of the personal computer 204 to download (add) or delete (remove) media items from the personal computer 204. In one embodiment, the media manager 206 and its associated user interface are provided by iTunes, version 2.0, from Apple Computer, Inc. of Cupertino, Calif.

Figure 3:
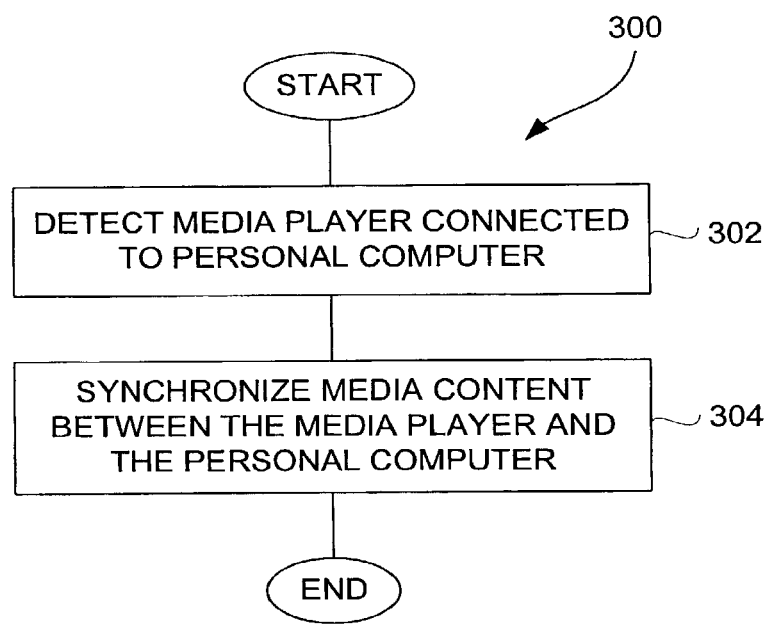
FIG. 3 is a flow diagram of media manager processing according to one embodiment of the invention.

FIG. 3 is a flow diagram of media manager processing 300 according to one embodiment of the invention. The media manager processing 300 is, for example, performed by the media manager 106 illustrated in FIG. 1 or the media manager 206 illustrated in FIG. 2.

The media manager processing 300 initially detects 302 a media player connected to a personal computer (host computer). Here, when the media player is connected to the personal computer, a synchronization operation can be performed to synchronize the media content between the media player and the personal computer. After the media player has been detected as being connected to the personal computer, the media content between the media player and the personal computer can be synchronized 304. The synchronization can be performed in a one-way (i.e., uni-directional) manner or in a two-way (i.e., bi-directional) manner. In a preferred embodiment, the synchronization is one-way from the personal computer to the media player. In another embodiment, the synchronization can be one-way from the media player to the personal computer. In still another embodiment, the synchronization can be two-way from the media player to the personal computer as well as from the personal computer to the media player. In any case, the media player typically has less media storage capacity than the personal computer and thus may limit the extent of the synchronization that can be performed. The synchronization processing can be performed manually assuming that a media player has already been detected 302 or automatically upon such detection. In the case of automatic synchronization following detection of the connection, synchronization is performed without a user interacting with any buttons or user interface elements, that is, the connection itself initiates the synchronization.

Figure 4:
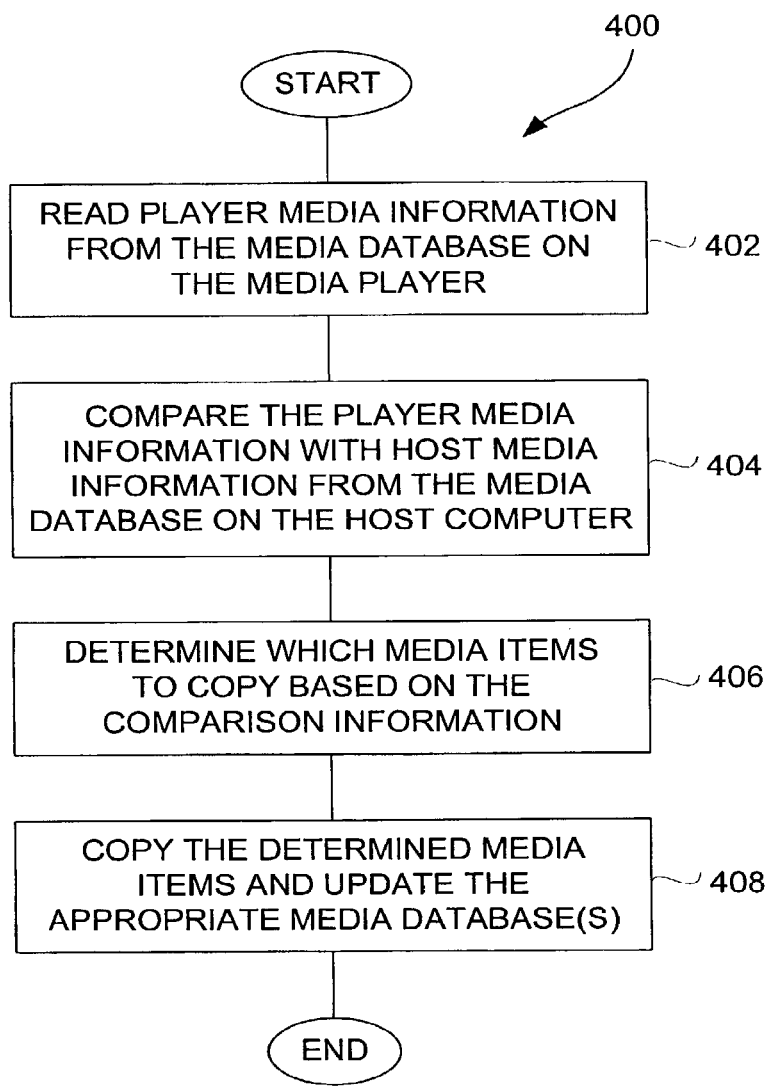
FIG. 4 is flow diagram of synchronization processing according to one embodiment of the invention.

FIG. 4 is flow diagram of synchronization processing 400 according to one embodiment of the invention. The synchronization processing 400 is, for example, performed by a host computer, such as the personal computer 104 illustrated in FIG. 1 or the personal computer 204 illustrated in FIG. 2. More specifically, the synchronization processing 400 is performed by the media manager 106 illustrated in FIG. 1 or the media manager 206 illustrated in FIG. 2.

The synchronization processing 400 initially reads 402 player media information from a media database on a media player. Next, the player media information is compared 404 with first media information from a media database on a host computer. Such comparison produces comparison information concerning differences between the player media information and the host media information. Next, the synchronization processing 400 determines 406 one or more media items to copy between the host computer and the media player based on the comparison information. For example, media items (e.g., audio files for songs) can be compared using media information such as song title, album name and/or artist name, which pertain to characteristics or attributes of the media items. Thereafter, the determined one or more media items are copied 408 and the appropriate media database(s) are updated. Following the operation 408, the synchronization processing 400 is complete and ends.

According to one embodiment, the comparison of player media information and host media information is performed using media attributes of the various media items. Namely, a media item on the media player can be deemed the same media item as one resident on the host computer if its media attributes sufficiently match. Examples of media attributes include title, album, track, artist, composer and genre. These attributes are particular to a particular media item. In addition, other media attributes can pertain to quality characteristics of the media item. Examples of such media attributes include bit rate, sample rate, equalization setting, volume adjustment, start/stop and total time. Hence, in one embodiment, if the above-identified media attributes (e.g., title, album, track, artist and composer) pertaining to a media item on the media player all match those same media attributes pertaining to a media item on the host computer, then the two media items stored on different devices can be deemed the same even though still further attributes or characteristics may cause these media items to not be exact duplications of one another. For example, if modification dates associated with files respectively storing the media items were different, this difference in modification date would not trigger the copying of such media items from the host computer to the media player when the above-identified media attributes match.

Hence, the intelligence of the synchronization processing of the invention allows the amount of data transfer to be properly managed such that it is relatively low or minimized. Although conventional approaches are able to transfer files from a host computer to a portable device, when dealing with media items, filenames and modification dates tend not to be reliable indicators of whether data transfer needs to be transferred (i.e., copied). As a result, using conventional data transfer techniques with respect to media items results in slow and inefficient operation and thus tends to present an unsatisfactory user experience.

Although the synchronization processing 400 makes use of media databases at the host computer and the media player, in another embodiment, the needed host media information and the player media information can be gathered from the media items themselves. In one implementation, such media information can be acquired from metadata provided with the media items. However, by providing the media databases, synchronization is able to be performed more efficiently and quickly.

Figure 5A:
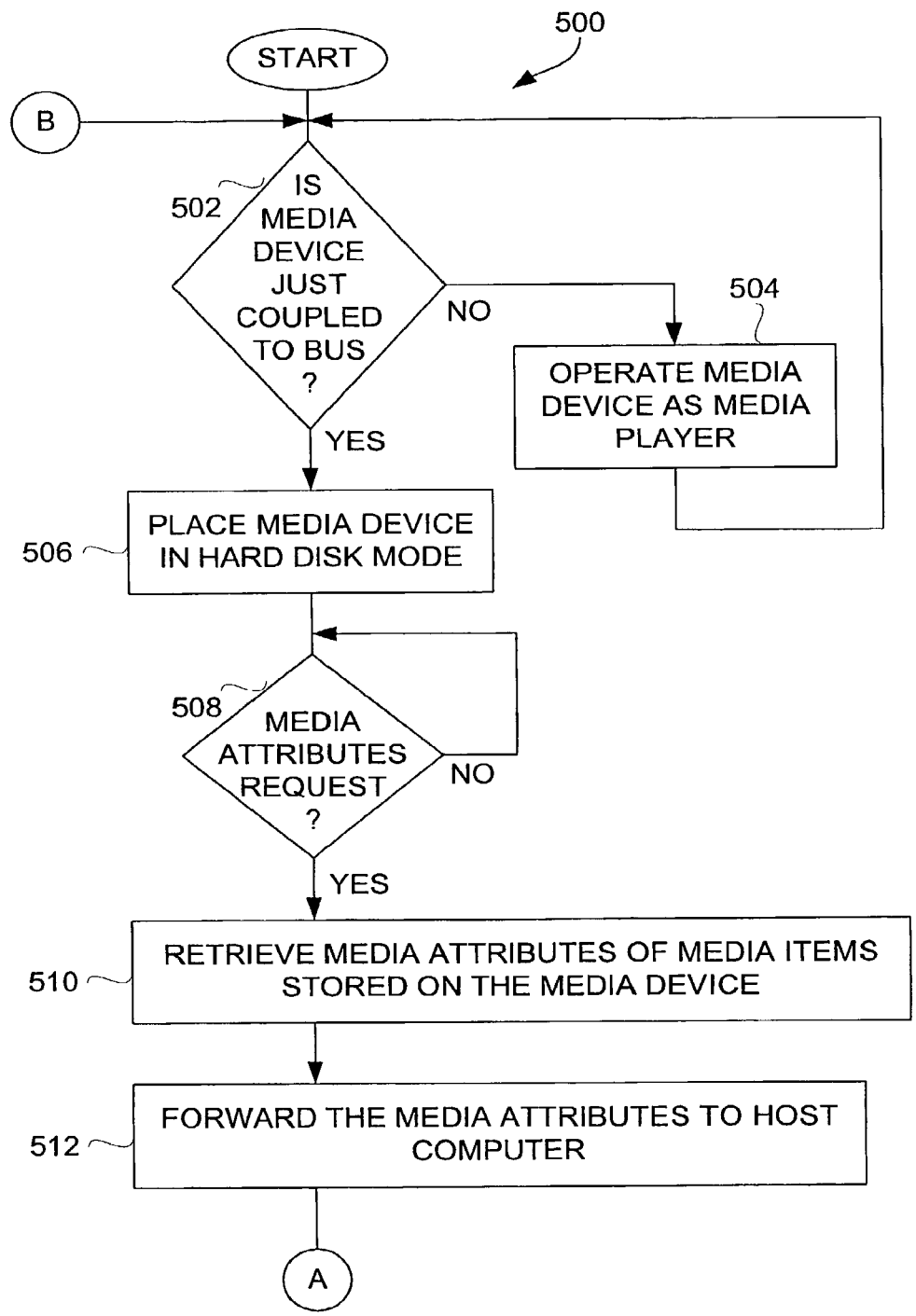
FIGS. 5A and 5B illustrate media device synchronization processing according to one embodiment of the invention.
Figure 5B:
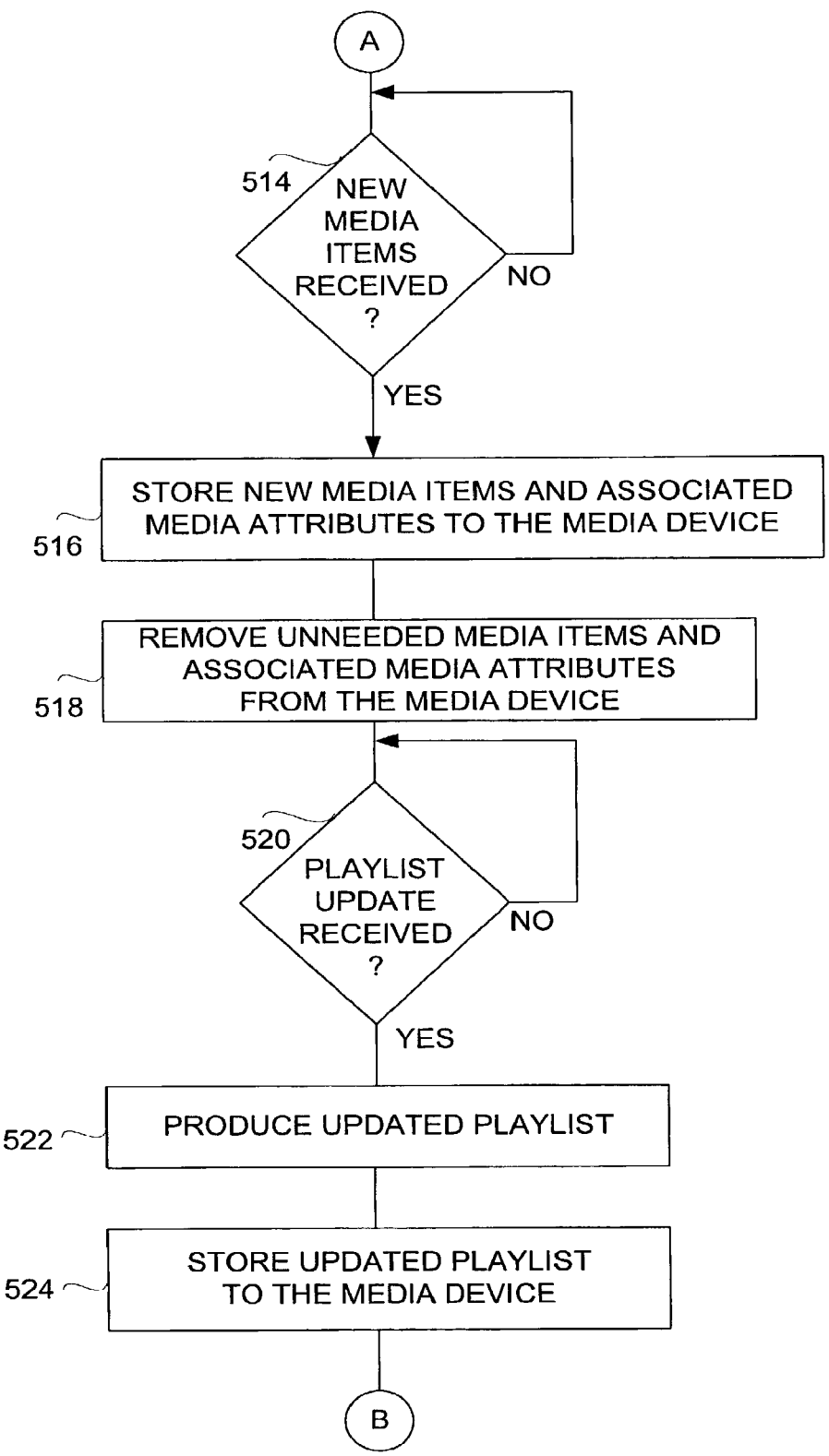

FIGS. 5A and 5B illustrate media device synchronization processing 500 according to one embodiment of the invention. The media device synchronization processing 500 is performed by a media device that interacts with a host computer over a network. For example, the media device can pertain to the media player 102 illustrated in FIG. 1 or the media player 202 illustrated in FIG. 2.

The media device synchronization processing 500 is generally operative on the media device when the media device is powered on. Initially, a decision 502 determines whether the media device has just been coupled to a bus. The decision 502 can be performed periodically to check for a recent connection to a bus or can be triggered by hardware detection of connection to a bus. The bus is a communication bus coupled to the host computer. In one embodiment, the bus is a serial bus such as FIREWIRE or Universal Serial Bus (USB). When the decision 502 determines that the media device has not just been coupled to a bus, then the media device is operated 504 as a media player. In such a mode, the media device operates to browse, search or play media items for its user. The media items can, for example, be audio items (e.g., songs) that are able to be played. Following the operation 504, the media device synchronization processing 500 returns to repeat the decision 502 and subsequent operations.

On the other hand, when the decision 502 determines that the media device has just been coupled to the bus, then the media device is placed in a hard disk mode. In the hard disk mode, the media device acts as an external hard drive to the host computer. A decision 508 then determines whether the host computer has requested media attributes for the media items residing on the media device. When the decision 508 determines that the host computer is not requesting media attributes, the media device can, but need not, perform other hard drive operations for non-synchronization purposes (not shown). When the decision 508 determines that the host computer is requesting media attributes (i.e., such as through a read operation), then the media attributes of the media items stored on the media device are retrieved 510. After the media attributes are retrieved 510, the media attributes are forwarded 512 to the host computer.

Next, a decision 514 determines whether new media has been received at the media device from the host computer. In other words, in an effort to synchronize the media content residing on the media device with the media content residing at the host computer, the media device will often receive media content from the host computer. Hence, the decision 514 determines whether new media items have been or are presently being received. When the decision 514 determines that such new media items have not been received, then the media device synchronization processing 500 can await such new media items. While waiting for new media items, the media device can, but need not, perform other hard drive operations for non-synchronization purposes (not shown). More generally, other hard disk operations can occur concurrently with synchronization operations. On the other hand, when the decision 514 determines that new media items have been received from the host computer, then the new media items and their associated media attributes are stored 516 to the media device. In one embodiment, the new media items are stored into files on the media device, and the associated media attributes pertaining to the media items are stored in a media database residing on the media device. Additionally, any unneeded media items and their associated media attributes can be removed 518 from the media device. Hence, in this embodiment, by synchronizing the media content residing on the media device with that on the host computer, new media items are not only stored to the media device, but unneeded (e.g., old) media items and their associated media attributes are also removed from the media device.

Following the operation 518, a decision 520 determines whether a playlist update has been received. When the decision 520 determines that a playlist update has not been received, then the media device synchronization processing 500 can await such a playlist update. Alternatively, when the decision 520 determines that a playlist update has been received, then an updated playlist for the media device is produced 522. The playlist update could be the updated playlist or could be instructions to update an existing playlist. The updated playlist is then stored 522 to the media device.

In effect, one or more playlists at the host computer can be synchronized with the media device and thus made available to the media device. A playlist identifies particular media items that are to be played in a sequence. Internally, the playlist can be represented in the media database as a data structure that points to files of the appropriate media items residing on the storage device within the media device. Hence, for a given playlist, the pointers to the files of the appropriate media items on the media device will differ from the pointers to the files for the same media items on the host computer, thus the need to update the pointers if a particular playlist is moved between the host computer and the media device.

Figure 6A:
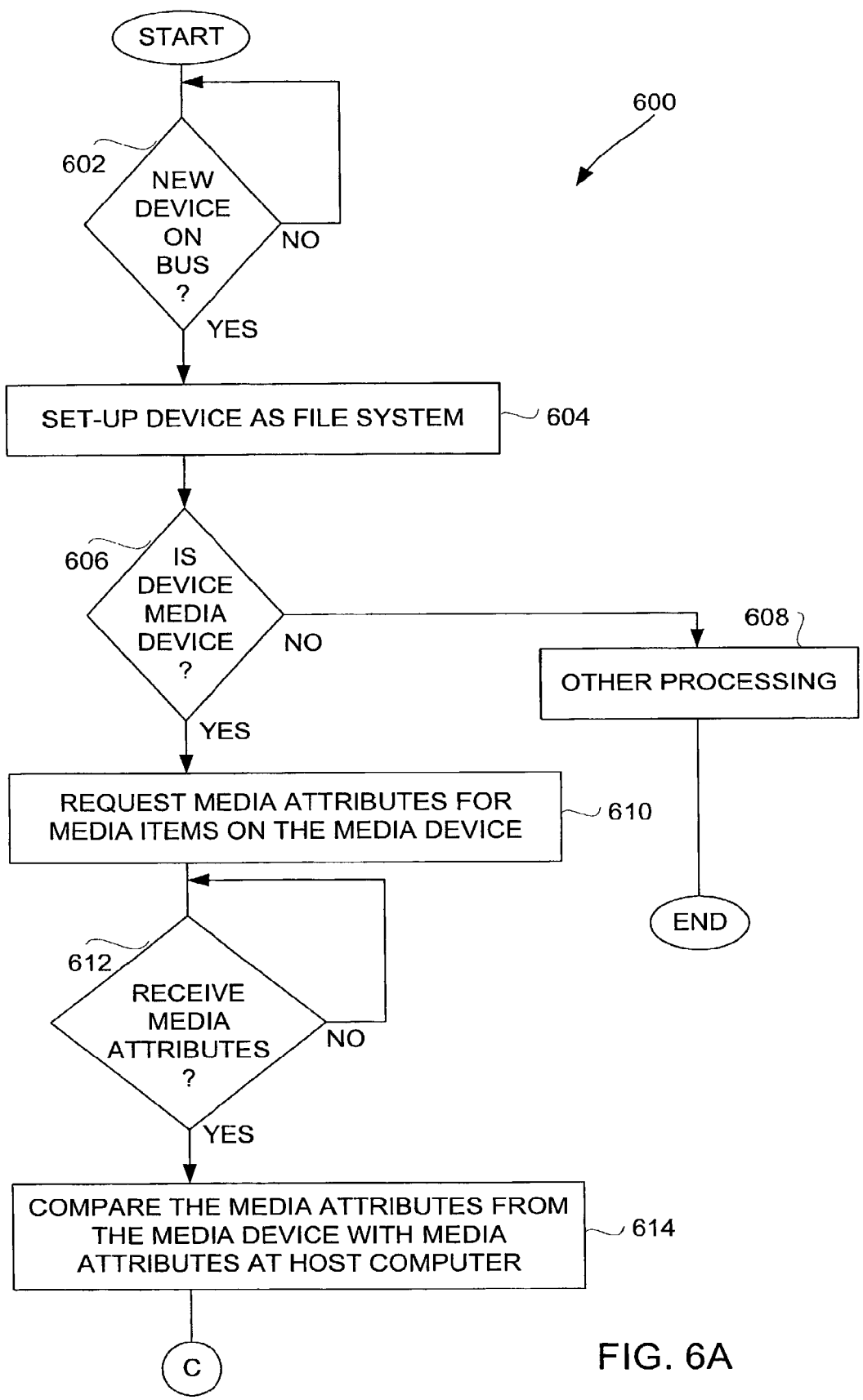
FIGS. 6A and 6B are flow diagrams of host computer synchronization processing according to one embodiment of the invention.
Figure 6B:
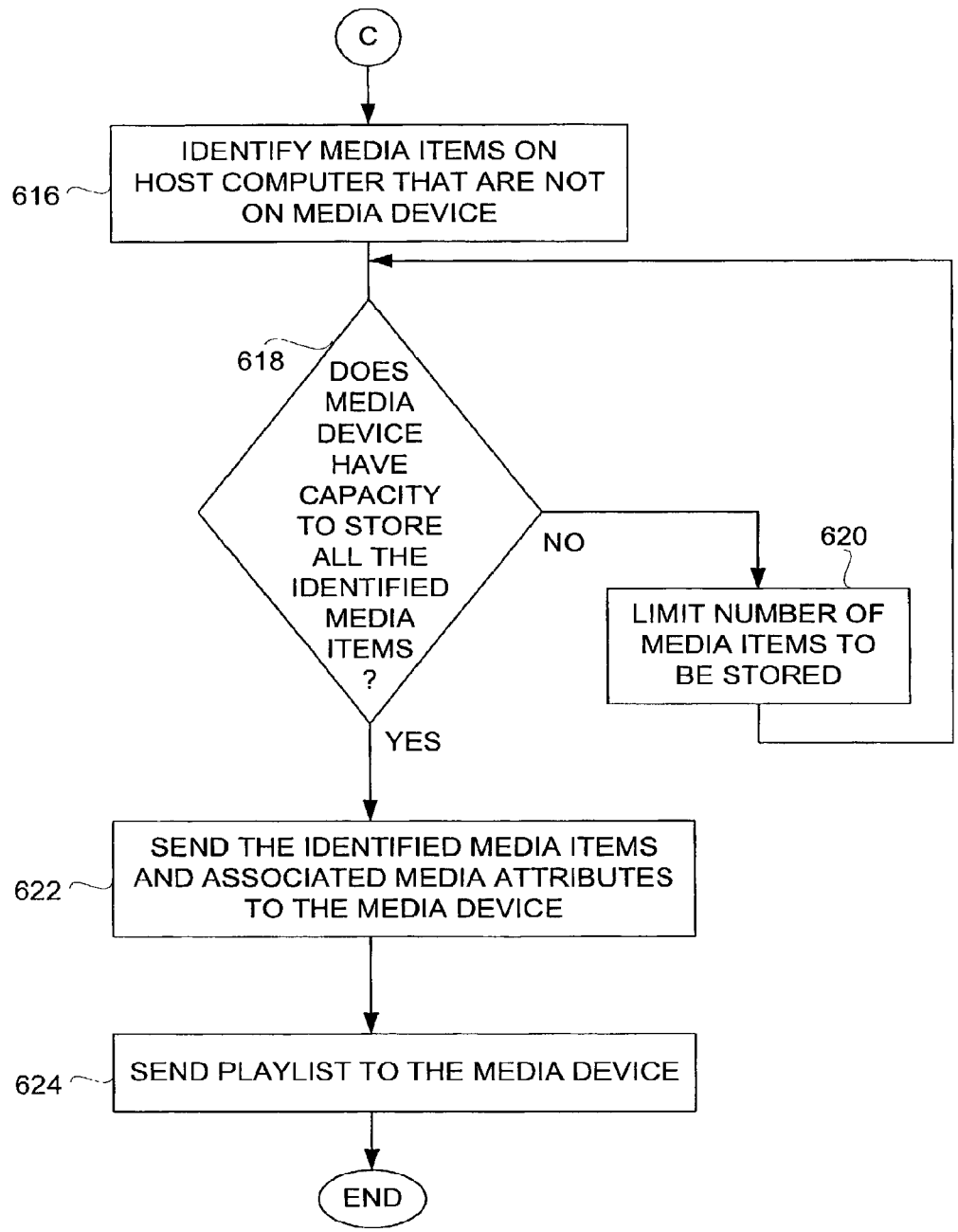

FIGS. 6A and 6B are flow diagrams of host computer synchronization processing 600 according to one embodiment of the invention. The host computer synchronization processing 600 is, for example, performed by a host computer. The host computer can, for example, be the personal computer 104 illustrated in FIG. 1 or the personal computer 204 illustrated in FIG. 2.

The host computer synchronization processing 600 begins with a decision 602 which monitors a bus (i.e., peripheral bus) to determine whether any new devices have been attached. In one implementation, the monitoring is limited to a particular category of devices (e.g., FIREWIRE devices). Such monitoring can, for example, be performed by polling the device(s)

on the bus or by receiving a new device alert. When the decision 602 determines that no new devices have been attached to the bus, then the host computer synchronization processing 600 awaits the presence of a new device. Once the decision 602 determines that a new device is present on the bus, then the device is set up 604 as a file system with respect to the host computer. As such, an operating system for the host computer is able to access (read, write and delete) files with respect to the file system (i.e., the new device).

Next, a decision 606 determines whether the device that is now present on the bus is a media device. When the decision 606 determines that the device is not a media device, then other processing 608 can be performed. Such other processing 608 is unrelated to synchronization processing and thus not further described herein. Following the other processing 608, the host computer synchronization processing 600 is complete and ends with synchronization not having been performed.

On the other hand, when the decision 606 determines that the device is a media device, then media attributes for media items on the media device are requested 610. Typically, the media attributes for all the media items residing on the media device would be retrieved. A decision 612 then determines whether the media attributes have been received. When the decision 612 determines that the media attributes have not yet been received, then the host computer synchronization processing 600 can await their receipt. Once the decision 612 determines that the media attributes have been received, then the media attributes from the media device are compared 614 with media attributes for the media items residing on the host computer. Here, the comparison 614 of media attributes with respect to the media device and the host computer results in comparison information. The comparison information indicates directly or indirectly which media items are present at the host computer but not present at the media device as well as which media items are present at the media device but not present at the host computer. Following the comparing 614, the media items on the host computer that are not on the media device are identified 616.

Next, a decision 618 determines whether the media device has the capacity to store all the identified media items. Here, the decision 618 determines whether the media device has sufficient storage capacity to store the one or more media items that have been identified 616 as on the host computer but not on the media device. When the decision 618 determines that the media device does not have sufficient capacity, then the number of media items to be stored is limited 620. There are numerous ways to limit the number of media items to be stored. For example, one or more of the media items to be stored can be de-selected (i.e., not selected) such that they are not to be stored to the media device. The one or more media items to be de-selected can be chosen in a variety of different ways. For example, the one or more items to be de-selected could be chosen randomly, chosen based on file size, chosen based on position in playlist, etc. Following the operation 620, the host computer synchronization processing 600 returns to repeat the decision 618 and subsequent operations.

When the decision 618 determines that the media device has sufficient capacity to store all of the identified media items, the identified media items and their associated media attributes are sent to the media device. Here, the remaining identified media items and their associated media attributes are sent (i.e., copied) from the host computer to the media device where they are to be stored. A playlist can also be sent 624 to the media device. The playlist can represent a new playlist or an updated version of a previously existing playlist.

Before sending 624 the playlist to the media device, the playlist can be modified for use on the media device. Alternatively, the media device itself could update the playlist for use on the media device.

Additionally, although not illustrated in FIGS. 6A and 6B, according to another embodiment, the host computer synchronization processing 600 at operation 614 can also identify those of the media items on the media device that are not on the host computer. Then, the host computer can operate to interact with the media device to remove (e.g., delete) those media items stored on the media device that are not stored at the host computer. Such additional processing would be performed after the operation 616 and prior to the decision 618 so that the storage capacity of the media device can be fully utilized.

The media device synchronization processing 500 and the host computer synchronization processing 600 interact to synchronize media items on the media device to those media items on the host computer. Such synchronization can consider all media items or can be limited to synchronizing only a subset of media content, such as media items pertaining to one or more playlists. The media attribute comparison provided by the invention is facilitated through the use of databases, both on the host computer and on the media device.

In one implementation, the host computer synchronization processing 600 can utilize an application resident on the host computer to perform the comparison and updating of the media items and their attributes between the host computer and the media device. One such application is iTunes, version 2.0, produced by Apple Computer, Inc. of Cupertino, Calif.

Figure 7:
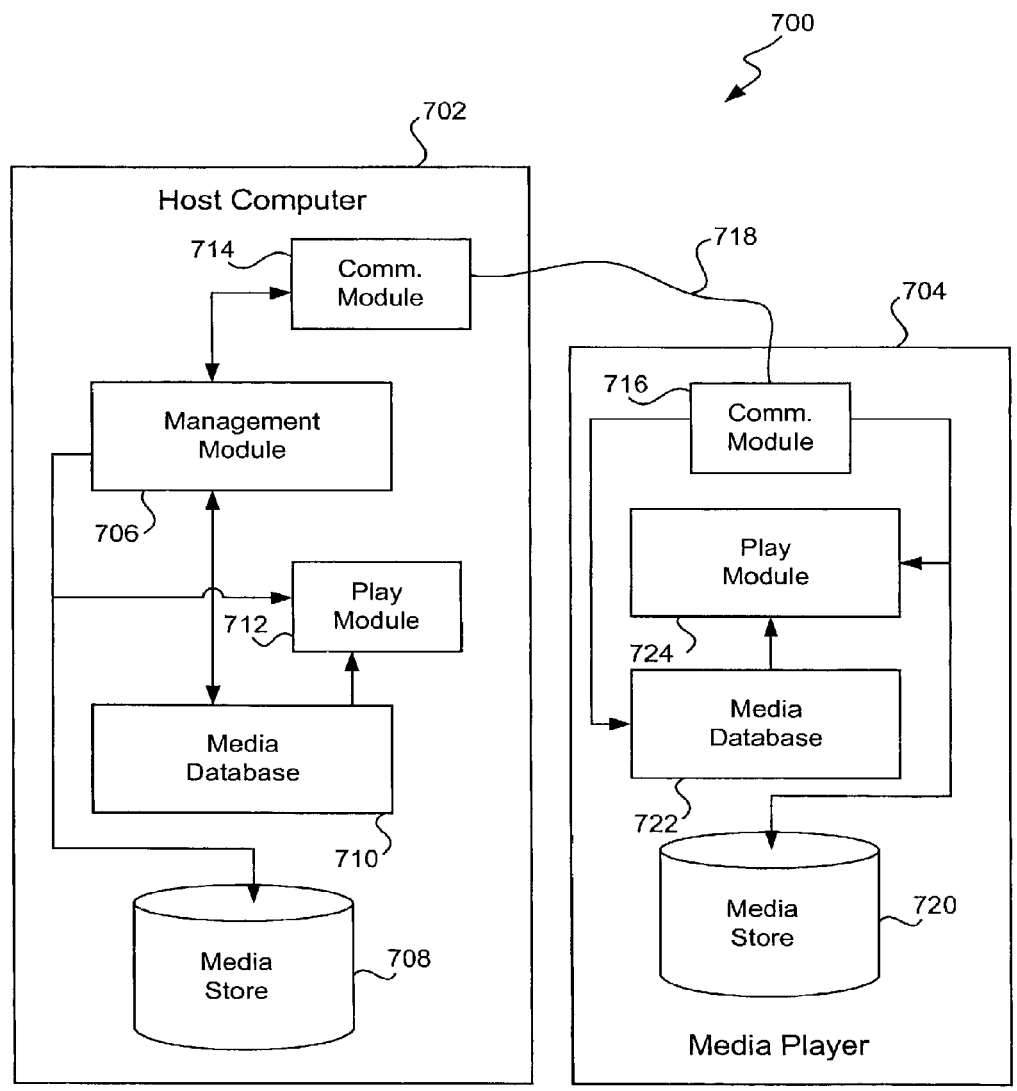
FIG. 7 is a block diagram of a media management system according to another embodiment of the invention.

FIG. 7 is a block diagram of a media management system 700 according to another embodiment of the invention. The media management system 700 includes a host computer 702 and a media player 704. The host computer 702 is typically a personal computer. The host computer, among other conventional components, includes a management module 706 which is a software module. The management module 706 provides for centralized management of media items (and/or playlists) not only on the host computer 702 but also on the media player 704. More particularly, the management module 706 manages those media items stored in a media store 708 associated with the host computer 702. The management module 706 also interacts with a media database 710 to store media information associated with the media items stored in the media store 708.

The media information pertains to characteristics or attributes of the media items. For example, in the case of audio or audiovisual media, the media information can include one or more of: title, album, track, artist, composer and genre. These types of media information are particular to particular media items. In addition, the media information can pertain to quality characteristics of the media items. Examples of quality characteristics of media items can include one or more of: bit rate, sample rate, equalization setting, volume adjustment, start/stop and total time.

Still further, the host computer 702 includes a play module 712. The play module 712 is a software module that can be utilized to play certain media items stored in the media store 708. The play module 712 can also display (on a display screen) or otherwise utilize media information from the media database 710. Typically, the media information of interest corresponds to the media items to be played by the play module 712.

The host computer 702 also includes a communication module 714 that couples to a corresponding communication module 716 within the media player 704. A connection or link 718 removeably couples the communication modules 714 and 716. In one embodiment, the connection or link 718 is a data bus, such as a FIREWIRE bus or USB bus, which is well known in the art.

The media player 704 also includes a media store 720 that stores media items within the media player 704. The media items being stored to the media store 720 are typically received over the connection or link 718 from the host computer 702. More particularly, the management module 706 sends all or certain of those media items residing on the media store 708 over the connection or link 718 to the media store 720 within the media player 704. Additionally, the corresponding media information for the media items that is also delivered to the media player 704 from the host computer 702 can be stored in a media database 722. In this regard, certain media information from the media database 710 within the host computer 702 can be sent to the media database 722 within the media player 704 over the connection or link 718. Still further, playlists identifying certain of the media items can also be sent by the management module 706 over the connection or link 718 to the media store 720 or the media database 722 within the media player 704.

Furthermore, the media player 704 includes a play module 724 that couples to the media store 720 and the media database 722. The play module 724 is a software module that can be utilized to play certain media items stored in the media store 720. The play module 724 can also display (on a display screen) or otherwise utilize media information from the media database 722. Typically, the media information of interest corresponds to the media items to be played by the play module 724.

Hence, in one embodiment, the media player 704 has limited or no capability to manage media items on the media player 704. However, the management module 706 within the host computer 702 can indirectly manage the media items residing on the media player 704. For example, to "add" a media item to the media player 704, the management module 706 serves to identify the media item to be added to the media player 704 from the media store 708 and then causes the identified media item to be delivered to the media player 704. As another example, to "delete" a media item from the media player 704, the management module 706 serves to identify the media item to be deleted from the media store 708 and then causes the identified media item to be deleted from the media player 704. As still another example, if changes (i.e., alterations) to characteristics of a media item were made at the host computer 702 using the management module 706, then such characteristics can also be carried over to the corresponding media item on the media player 704. In one implementation, the additions, deletions and/or changes occur in a batch-like process during synchronization of the media items on the media player 704 with the media items on the host computer 702.

In another embodiment, the media player 704 has limited or no capability to manage playlists on the media player 704. However, the management module 706 within the host computer 702 through management of the playlists residing on the host computer can indirectly manage the playlists residing on the media player 704. In this regard, additions, deletions or changes to playlists can be performed on the host computer 702 and then by carried over to the media player 704 when delivered thereto.

As previously noted, synchronization is a form of media management. The ability to automatically initiate synchronization was also previously discussed. Still further, however, the synchronization between devices can be restricted so as to prevent automatic synchronization when host computer and media player do not recognize one another.

Figure 8:
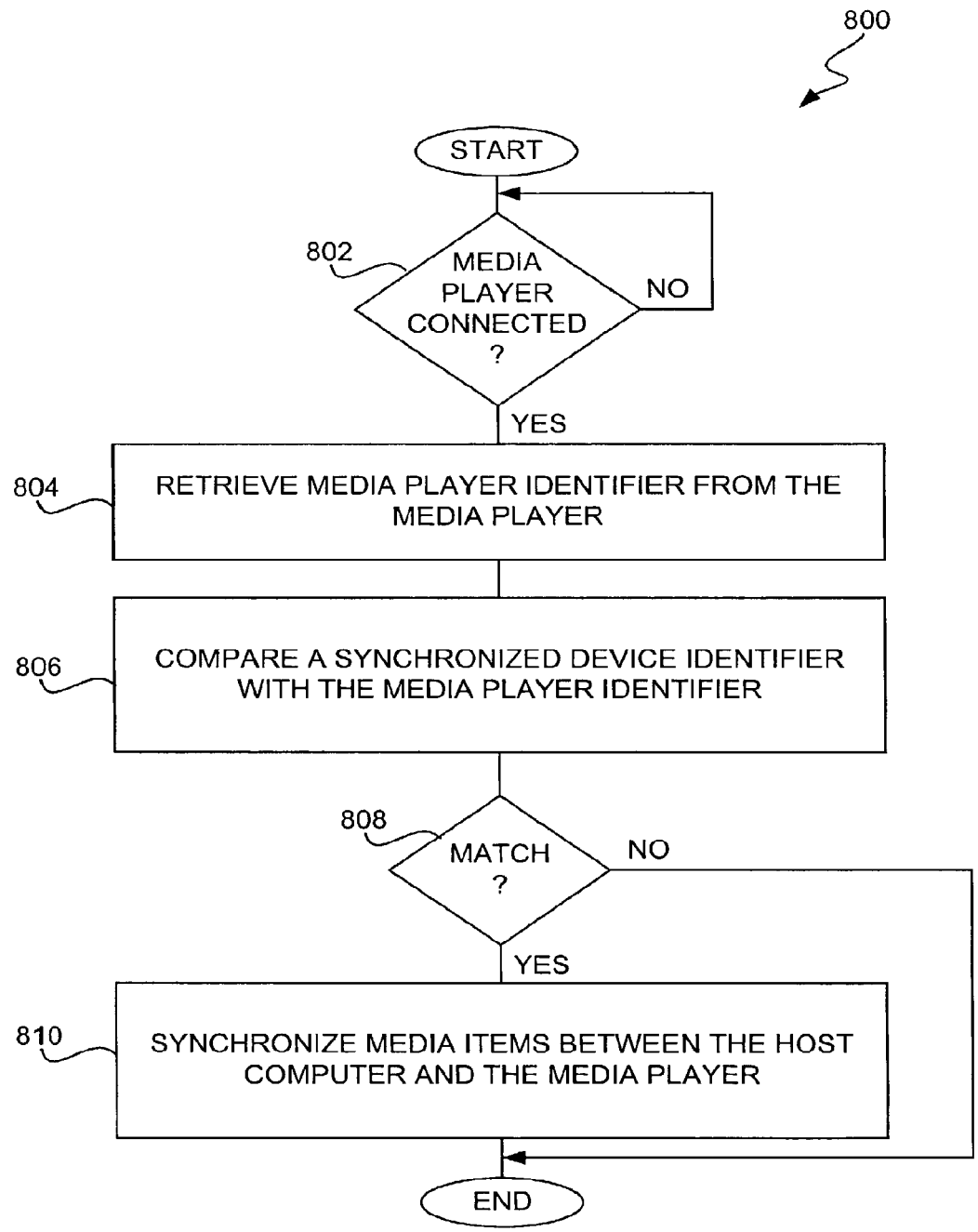
FIG. 8 is a flow diagram of automatic synchronization processing according to one embodiment of the invention.

FIG. 8 is a flow diagram of automatic synchronization processing 800 according to one embodiment of the invention. The automatic synchronization processing 800 is, for example, performed by a host computer. For example, the host computer can be the personal computer 104 illustrated in FIG. 1, the personal computer 204 illustrated in FIG. 2, the host computer 702 illustrated in FIG. 7, or some other host computer.

The automatic synchronization processing 800 begins with a decision 802 that determines whether a media player is connected. When the decision 802 determines that a media player is not connected, then the decision 802 causes the automatic synchronization processing 800 to wait for a media player to be connected. Once the decision 802 determines that a media player has been connected, a media player identifier is retrieved 804 from the media player. Then, a synchronized device identifier, which is stored at the host computer, is compared 806 with the media player identifier.

Next, a decision 808 determines whether the synchronized device identifier matches the media player identifier. When the decision 808 determines that the synchronized device identifier does match the media player identifier, the media items are synchronized 810 between the host computer and the media player. The synchronization of the media items between the host computer and the media player can be performed in a variety of different ways. In one example, the synchronization can perform the operations 402-408 of FIG. 4. In another example, the synchronization can perform the operations 610-624 of FIGS. 6A and 6B. Alternatively, when the decision 808 determines that the synchronized device identifier does not match the media player identifier, the synchronization operation 810 is bypassed.

Here, the media items between the host computer and the media player are not synchronized because the particular host computer is not designated as the host for the particular media player. In this regard, the media items stored on the media player are protected from inadvertent removal (deletion) during synchronization. For example, the synchronization is typically performed such that the media items on the host computer are copied to the media player (to the extent not already present) and the media items on the media player but not the host computer are removed. Hence, synchronization (namely, automatic synchronization) is prevented when the identifiers do not signal that the host computer is the proper host. Consequently, the media player synchronizes or not in a more intelligent and user friendly manner. Following the operation 810 or its being bypassed, the automatic synchronization processing 800 is complete and ends.

According to one embodiment, when a media player is first connected to a host computer (or even more generally when matching identifiers are not present), the user of the media player is queried as to whether the user desires to affiliate, assign or lock the media player to the host computer. When the user of the media player elects to affiliate, assign or lock the media player with the host computer, then a pseudo-random identifier is obtained and stored in either the media database or a file within both the host computer and the media player. In one implementation, the identifier is an identifier associated with (e.g., known or generated by) the host computer or its management module and such identifier is sent to and stored in the media player. In another implementation, the identifier is associated with (e.g., know or generated by) the media player and is sent to and stored in a file or media database of the host computer.

Figure 9:
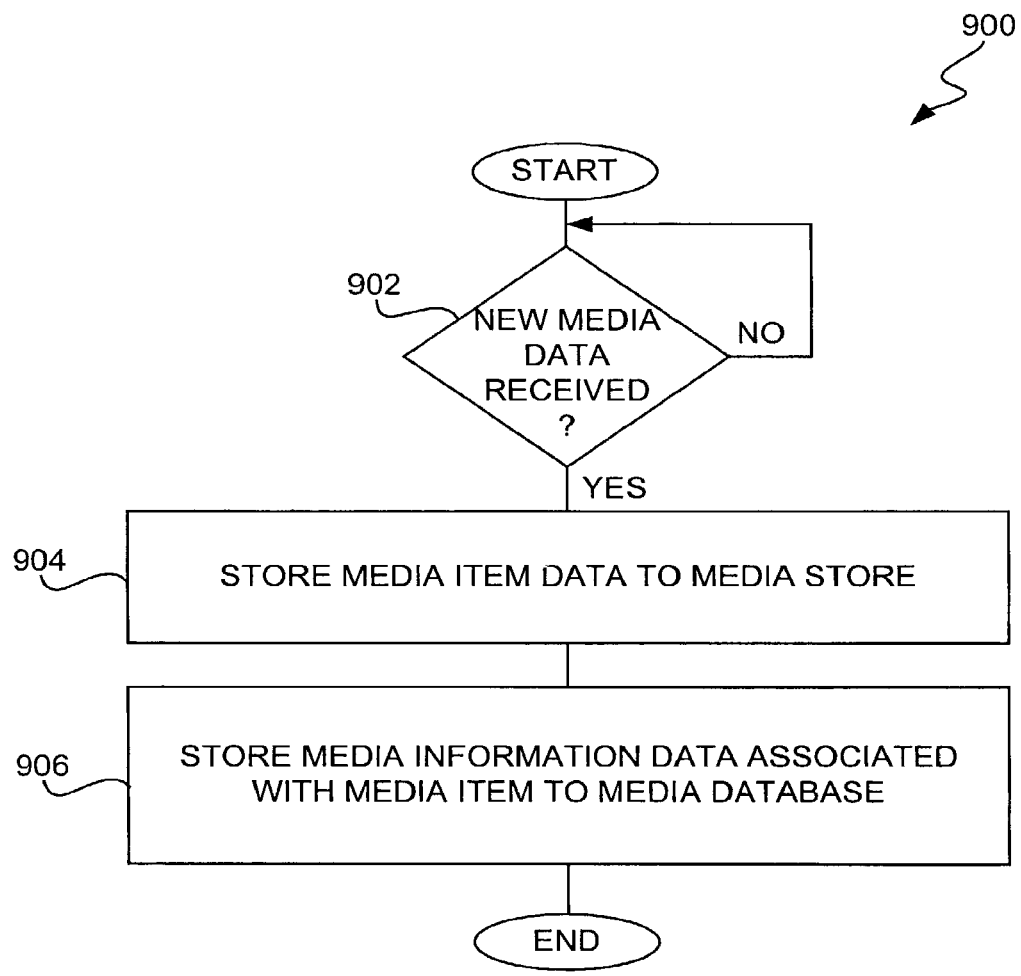
FIG. 9 is a flow diagram of media download processing according to one embodiment of the invention.

FIG. 9 is a flow diagram of media download processing 900 according to one embodiment of the invention. The media download processing 900 is, for example, processing performed by a media player. For example, the media player can be the media player 102 illustrated in FIG. 1, the media player 202 illustrated in FIG. 2, the media player 704 illustrated in FIG. 7, or some other media player.

The media download processing 900 begins with a decision 902 that determines whether new media data has been received. Here, the decision determines whether new media data is being received from a host computer (personal computer). Typically, the new media data would be received at the media player when the host computer downloads media data from the host computer to the media player. When the decision 902 determines that new media data has not been received, then the media download processing 900 awaits such data.

Once the decision 902 determines that new media data has been received, the media data is stored to the media player. More specifically, the media data being received can include one or both of media item data and media information data. The media information data pertains to attributes or characteristics of the corresponding media items. The media information can vary with application. In one implementation, the media information includes at least descriptive attributes such as song title, album name and artist name. Further, the media information can include quality characteristics for the media items. Examples of such quality characteristics include bit rate, sample rate, equalization setting, volume adjustment, start/stop and total time.

In any case, the new media data is processed by the media download processing 900 as follows. The media item data is stored 904 to a media store associated with the media player. The media item data pertains to one or more media items. Further, the media information data associated with the one or more media items is stored 906 to a media database. The media database is also associated with the media player. Following the operation 906, the media download processing 900 is complete and ends.

Equalization settings pertain to amplitude settings for a plurality of different frequency bands, as is commonplace with an equalizer. These settings can be set by a user or can be set from selection of one of a plurality of predetermined equalization settings. These equalization settings, whether predetermined or customized, enable the adjustment of the dynamic range of the player device to match the style of music one is listening to. Further, the equalizer settings utilized on the host computer side can be linked to corresponding equalizer settings on the media player side. In one embodiment, each of the equalization settings that are stored within the media database can pertain to a single media item. As an example, when the media items are songs or audio files, the equalization settings can be provided for each song or audio file. More generally, there can be a one-to-one correspondence between quality characteristics (e.g., equalization settings) and media items such that, when played, each media item would be played in accordance with its own corresponding quality characteristics. Hence, the quality characteristics can be provided on a media item by media item basis.

As previously noted, one quality characteristic of the media information is equalization settings. In one embodiment, the host computer and/or the media player provide predetermined equalization settings that are identified by a descriptive name. Hence, a user can simply select one of the descriptive names to choose the associated equalizer settings. Table 1 below provides examples of various equalization settings that are predetermined and identified by descriptive names.

| EQUALIZER PRESETS |
| --- |
| ACCOUSTIC |
| BASS BOOSTER |
| BASS REDUCER |
| CLASSICAL |
| DANCE |
| DEEP |
| ELECTRONIC |
| FLAT |
| HIP HOP |
| JAZZ |
| LATIN |
| LOUNGE |
| PIANO |
| POP |
| R&B |
| ROCK |
| SMALL SPEAKERS |
| SPOKEN WORD |
| TREBLE BOOSTER |
| TREBLE REDUCER |
| VOCAL BOOSTER |

Figure 10:
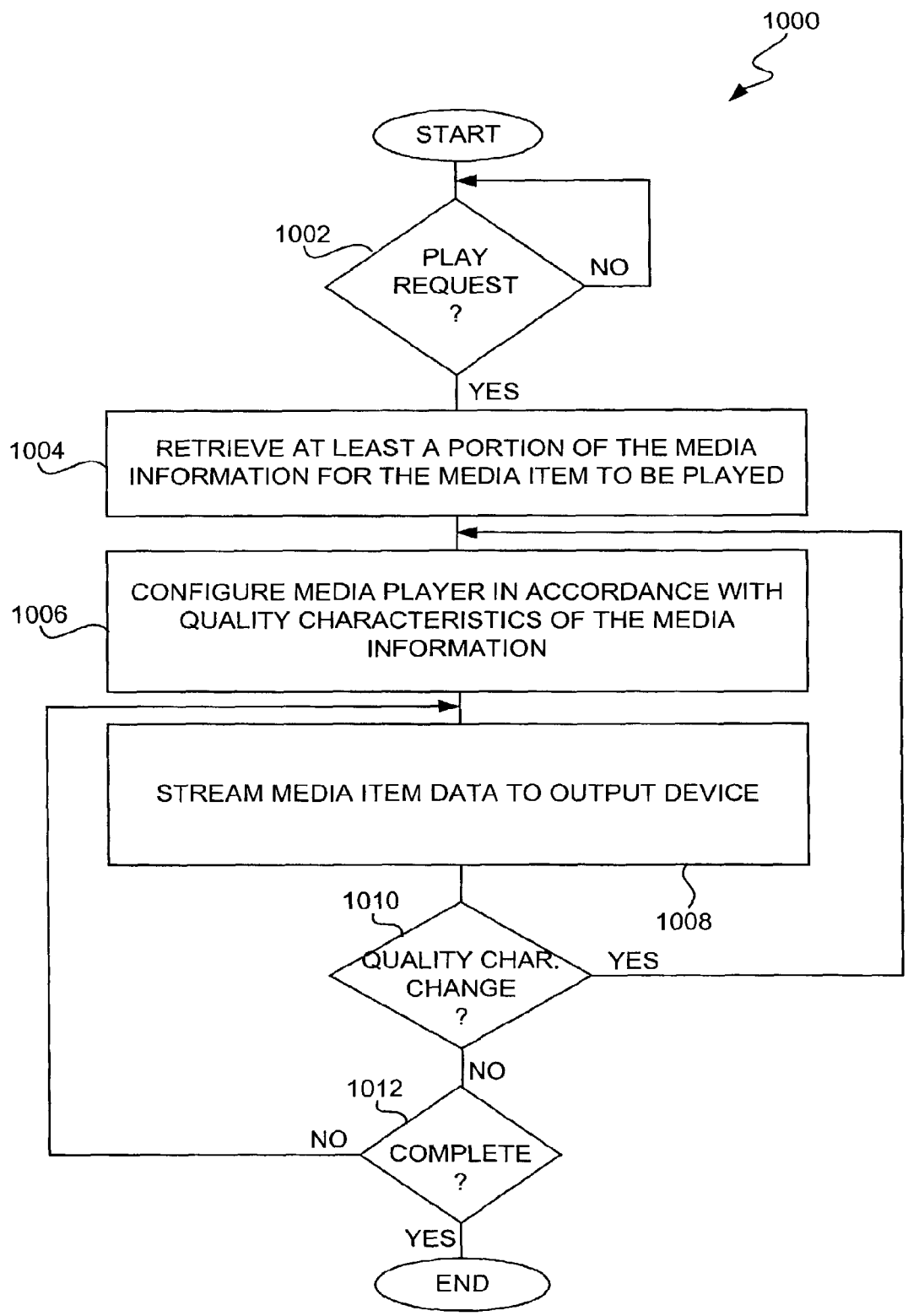
FIG. 10 is a flow diagram of media play processing according to one embodiment of the invention.

FIG. 10 is a flow diagram of media play processing 1000 according to one embodiment of the invention. The media play processing 1000 is, for example, performed by a media player, such as the media player 102 illustrated in FIG. 1, the media player 202 illustrated in FIG. 2, the media player 700 illustrated in FIG. 7, or some other media player.

The media play processing 1000 begins with a decision 1002 that determines whether a play request has been received. Here, a play request is typically initiated by a user of the media device. Hence, when the decision 1002 determines that a play request has not yet been received, the media play processing 1000 awaits such a request. When the decision 1002 determines that a play request has been received, the media play processing 1000 then retrieves 1004 at least a portion of the media information for the media item to be played. Here, the media information can vary as to its purposes and thus only a portion of the media information may be useful for playing the media item.

After the media information has been retrieved 1004, the media player is configured 1006 in accordance with one or more of the quality characteristics of the media information. Here, to the extent that the one or more quality characteristics of the media information can be used to configure the media player, the media player is so configured 1006. For example, in the case of equalization settings, the media player can be configured to operate its internal amplifier in accordance with the equalization settings provided by the quality characteristics associated with the media item to be played.

Subsequently, the media item data is streamed 1008 to an output device. For example, the streaming 1008 can cause the media item data to be retrieved from a local media store and directed to an output device (e.g., speaker and/or display screen) of the media player. The streaming 1008 of the media item data to the output device operates to produce a media output (audio and/or video) that results by playing the media item. Given that the media information is provided to the media player by the host computer, the media information set or configured for media items at the host computer is able to also be used in playing the media items on the media player.

Next, a decision 1010 determines whether a quality characteristic has changed. Typically, the decision 1010 can be activated when a user interacts with a Graphical User Interface (GUI) associated with the media player to manually change a quality characteristic for the media item being played. For example, a user could interact with a GUI for the media player to change the equalization settings. This could be on a per-media item or per-media player basis. Hence, when the decision 1010 determines that a quality characteristic has been changed, the media play processing 1000 can return to repeat the operation 1006 and subsequent operations. At this point, the media player can be reconfigured in accordance with the updated quality characteristics and then the media item can continue to thereafter be played in accordance with the updated quality characteristics. Such an implementation allows the user of the media player to manually alter the quality characteristics for the media player, overall or for a particular media item. However, it should be noted that the ability of the user to make manual changes to the quality characteristics can be restricted. For example, in one embodiment, quality characteristic settings provided by the host computer can override manual user settings.

On the other hand, when the decision 1010 determines that the quality characteristics have not changed, then a decision 1012 determines whether the media play processing 1000 is completed. When the decision 1012 determines that the media play processing 1000 has not completed, then the media play processing 1000 returns to repeat the operation 1008 and subsequent operations. Alternatively, when the decision 1012 determines that the media play processing 1000 has completed, then the media play processing 1000 is complete and ends.

Figure 11:
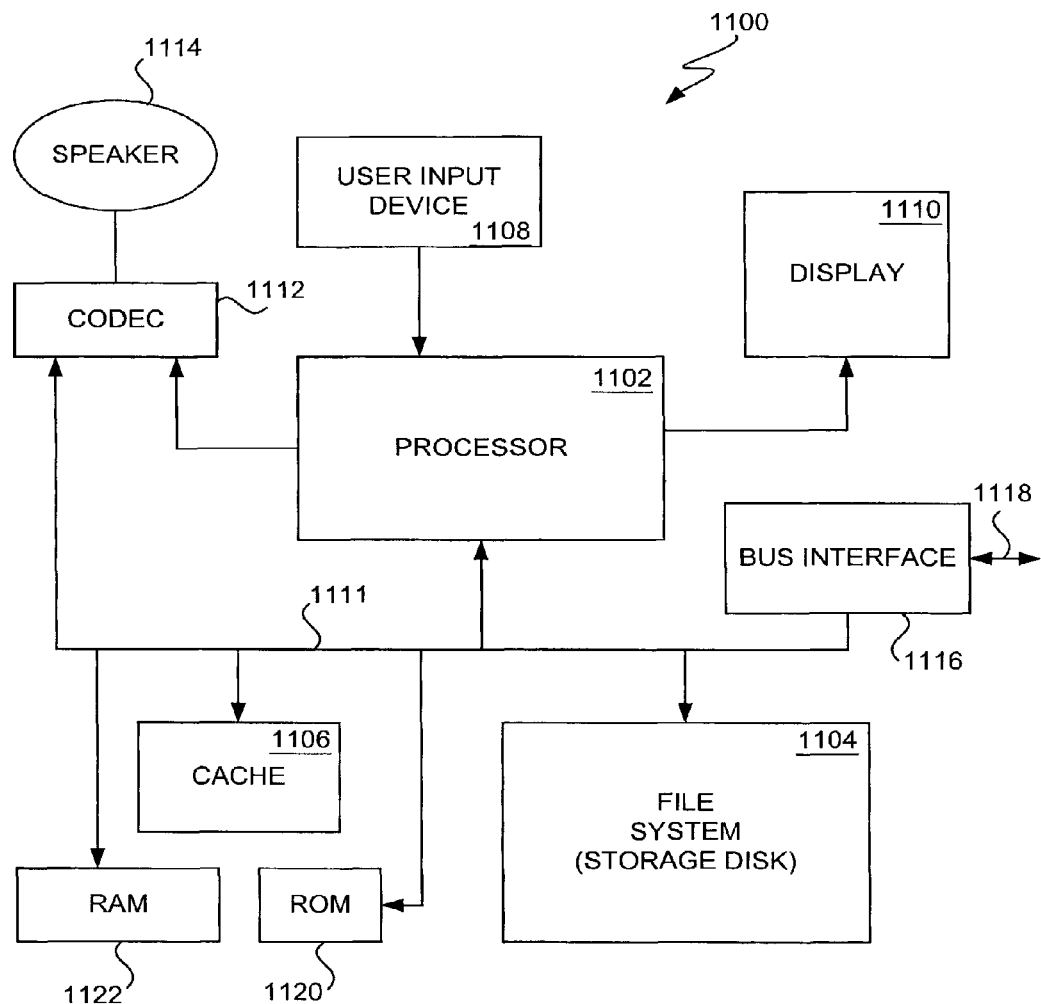
FIG. 11 is a block diagram of a media player according to one embodiment of the invention.

FIG. 11 is a block diagram of a media player 1100 according to one embodiment of the invention. The media player 1100 includes a processor 1102 that pertains to a microprocessor or controller for controlling the overall operation of the media player 1100. The media player 1100 stores media data pertaining to media items in a file system 1104 and a cache 1106. The file system 1104 is, typically, a storage disk or a plurality of disks. The file system 1104 typically provides high capacity storage capability for the media player 1100. However, since the access time to the file system 1104 is relatively slow, the media player 1100 can also include a cache 1106. The cache 1106 is, for example, Random-Access Memory (RAM) provided by semiconductor memory. The relative access time to the cache 1106 is substantially shorter than for the file system 1104. However, the cache 1106 does not have the large storage capacity of the file system 1104. Further, the file system 1104, when active, consumes more power than does the cache 1106. The power consumption is often a concern when the media player 1100 is a portable media player that is powered by a battery (not shown). The media player 1100 also includes a RAM 1120 and a Read-Only Memory (ROM) 1122. The ROM 1122 can store programs, utilities or processes to be executed in a non-volatile manner. The RAM 1120 provides volatile data storage, such as for the cache 1106.

The media player 1100 also includes a user input device 1108 that allows a user of the media player 1100 to interact with the media player 1100. For example, the user input device 1108 can take a variety of forms, such as a button, keypad, dial, etc. Still further, the media player 1100 includes a display 1110 (screen display) that can be controlled by the processor 1102 to display information to the user. A data bus 1111 can facilitate data transfer between at least the file system 1104, the cache 1106, the processor 1102, and the CODEC 1112.

In one embodiment, the media player 1100 serves to store a plurality of media items (e.g., songs) in the file system 1104. When a user desires to have the media player play a particular media item, a list of available media items is displayed on the display 1110. Then, using the user input device 1108, a user can select one of the available media items. The processor 1102, upon receiving a selection of a particular media item, supplies the media data (e.g., audio file) for the particular media item to a coder/decoder (CODEC) 1112. The CODEC 1112 then produces analog output signals for a speaker 1114. The speaker 1114 can be a speaker internal to the media player 1100 or external to the media player 1100. For example, headphones or earphones that connect to the media player 1100 would be considered an external speaker.

The media player 1100 also includes a bus interface 1116 that couples to a data link 1118. The data link 1118 allows the media player 1100 to couple to a host computer.

Although the media items of emphasis in several of the above embodiments were audio items (e.g., audio files or songs), the media items are not limited to audio items. For example, the media item can alternatively pertain to videos (e.g., movies) or images (e.g., photos).

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that a user is able to manage (e.g., synchronize) a media player with a host computer in a more sophisticated manner. Another advantage of the invention is that quality characteristics are able to be transferred along with media content from host computer to media player such that media is able to be played by the media player as it was configured to be played at the host computer. Still another advantage of the invention is that synchronization can not only be automatically initiated but also restricted to situations where a media player and a host computer recognize one another.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for performing synchronization of media items of a portable media player with a host computer and subsequent playback of one or more of the media items on the media player, the media player storing player media information, and the host computer storing host media information, said method comprising:

determining whether synchronization of the media player with the host computer should be performed;

synchronizing the media player with the host computer when said determining determines that synchronization of the media player with the host computer should be performed, wherein said synchronizing transfers one or more media items to the media player from the host computer, whereby for the one or more media items being transferred, media item data is received at the media player via a first electronic file and stored in a media store at the media player, and media information data is received at the media player via a second electronic file and stored in a media database at the media player, the second electronic file being distinct from the first electronic file, the media information data including at least one quality characteristic, and the at least one quality characteristic includes at least one or more user-specified equalization settings;

subsequently receiving a subsequent playback request to play an identified one of the media items; and configuring the media player to play the identified one of the media items, the media player being configured to play the identified one of the media items in accordance with at least one of the one or more user-specified equalization settings corresponding thereto, wherein the media player and the host computer are separate devices.

2. A method as recited in claim 1, wherein at least a plurality of the media items are songs or audio files, and wherein the equalization settings can be provided for each of the plurality of the media items that are song or audio files.

3. A method as recited in claim 1, wherein each of a plurality of the media items has it own corresponding user-specified equalization setting.

4. A method as recited in claim 1,
retrieving a media player identifier from the media player, wherein the media player identifier is an identifier that specifically identifies the media player; and comparing the media player identifier with a synchronized device identifier stored at the host computer to produce first comparison information, wherein the synchronized device identifier identifies a device that has been locked for synchronization with the host computer.

5. A method as recited in claim 4, wherein said determining whether synchronization between the media player and the host computer should be performed comprises determining that synchronization should be automatically performed if said comparing of the media player identifier with the synchronized device identifier indicates that the media player is the media player that has been previously locked for synchronization with the host computer.

6. A method as recited in claim 5, wherein said method further comprises:
querying a user of the media player as to whether the media player should be locked for synchronization to the host computer while unlocking any previously locked media player;
receiving a response to said querying of the user; and
locking the media player to the host computer for synchronization when the response to said querying indicates that the media player should be locked to the host computer.

7. A method as recited in claim 6, wherein the first comparison information indicates whether or not the media player identifier matches the synchronization identifier.

8. A method as recited in claim 6, wherein said method further comprises:
receiving a response to said querying of the user; and
locking the media player to the host computer for synchronization purposes when the response to said querying indicates that the media player should be locked to the host computer.

9. A method as recited in claim 1, wherein said synchronizing of the media player with the host computer comprises:

reading the player media information from the media player;
comparing the player media information with the host media information from the host computer to produce media comparison information;
determining which media items are to be copied between the media player and the host computer based on the media comparison information; and
copying the determined media items to perform the synchronization.

10. A method as recited in claim 9, wherein the player media information and the host media information comprise attributes of the media items.

11. A method as recited in claim 10, wherein the attributes include at least song title, album name and artist name.

12. A method as recited in claim 4, wherein the media player identifier and the synchronized device identifier serve to associate the media player with the host computer so as to permit subsequent automatic synchronizations between the media player and the host computer.

13. A method as recited in claim 1, wherein the media player identifier and the synchronized device identifier remain the same through a plurality of subsequent synchronizations.

14. A non-transitory computer readable storage medium including at least executable computer program code tangibly stored thereon for performing synchronization of media items of a media player with a host computer and subsequent playback of one or more of the media items on the media player, the media player storing player media information, and the host computer storing host media information, said non-transitory computer readable storage medium comprising:

computer program code for determining whether synchronization of the media player with the host computer should be performed;

computer program code for synchronizing the media player with the host computer if said computer program code for determining determines that synchronization of the media player with the host computer should be performed, wherein said computer program code for synchronizing transfers one or more media items to the media player from the host computer, whereby for the one or more media items being transferred, media item data and media information data are received at the media player and stored at the media player, the media information data including at least one quality characteristic, and the at least one quality characteristic includes at least one or more user-specified equalization settings;

computer program code for subsequently receiving a playback request to play an identified one of the media items; and computer program code for configuring the media player to play the identified one of the media items, the media player being configured to play the identified one of the media items in accordance with at least one of the one or more user-specified equalization settings corresponding thereto, wherein the media player and the host computer are separate devices.

15. A non-transitory computer readable storage medium as recited in claim 14, wherein said computer program code for synchronizing of the media player with the host computer comprises:

computer program code for reading the player media information from the media player;

computer program code for comparing the player media information with the host media information from the host computer to produce media comparison information;

computer program code for determining which media items are to be copied between the media player and the host computer based on the media comparison information; and computer program code for copying the determined media items to perform the synchronization.

16. A non-transitory computer readable storage medium as recited in claim 14, wherein the player media information and the host media information comprise attributes of the media items, and wherein the attributes include at least song title, album name and artist name.

17. A non-transitory computer readable storage medium as recited in claim 14, wherein at least a plurality of the media items are songs or audio files, and wherein the equalization settings can be provided for each of the plurality of the media items that are song or audio files.

18. A non-transitory computer readable storage medium as recited in claim 14,
computer program code for retrieving a media player identifier from the media player, wherein the media player identifier is an identifier that specifically identifies the media player; and
computer program code for comparing the media player identifier with a synchronized device identifier stored at the host computer to produce first comparison information, wherein the synchronized device identifier identifies a device that has been associated for synchronization with the host computer.

19. A non-transitory computer readable storage medium as recited in claim 18,
wherein said computer program code for determining whether synchronization between the media player and the host computer should be performed comprises computer program code for determining that synchronization should be automatically performed if said computer program code for comparing of the media player identifier with the synchronized device identifier indicates that the media player is the media player that has been previously associated for synchronization with the host computer, and
wherein said computer program code for synchronizing of the media player with the host computer is not automatically performed if said computer program code for comparing of the media player identifier with the synchronized device identifier indicates that the media player has not been previously associated for synchronization with the host computer.

20. A non-transitory computer readable storage medium as recited in claim 18, wherein the media player identifier and the synchronized device identifier serve to associate the media player with the host computer so as to permit subsequent automatic synchronizations between the media player and the host computer.

21. A non-transitory computer readable storage medium as recited in claim 20, wherein the media player identifier remains the same through a plurality of subsequent synchronizations.

22. A method as recited in claim 1,
wherein said method comprises:
retrieving a media player identifier from the media player, wherein the media player identifier is an identifier that specifically identifies the media player; and
comparing the media player identifier with a synchronized device identifier stored at the host computer to produce first comparison information, wherein the synchronized device identifier identifies a device that has been locked for synchronization with the host computer,
wherein said determining whether synchronization between the media player and the host computer should be performed comprises determining that synchronization should be automatically performed if said comparing of the media player identifier with the synchronized device identifier indicates that the media player is the media player that has been previously locked for synchronization with the host computer,
wherein said synchronizing of the media player with the host computer is not automatically performed when said determining determines that the media player identifier does not match the synchronization device identifier, and
wherein the media player identifier and the synchronized device identifier serve to associate the media player with the host computer so as to permit subsequent automatic synchronizations between the media player and the host computer.

23. A non-transitory computer readable storage medium as recited in claim 14,
wherein said non-transitory computer readable storage medium comprises:
computer program code for retrieving a media player identifier from the media player, wherein the media player identifier is an identifier that specifically identifies the media player; and
computer program code for comparing the media player identifier with a synchronized device identifier stored at the host computer to produce first comparison information, wherein the synchronized device identifier identifies a device that has been associated for synchronization with the host computer,
wherein said computer program code for determining whether synchronization between the media player and the host computer should be performed comprises computer program code for determining that synchronization should be automatically performed if said computer program code for comparing of the media player identifier with the synchronized device identifier indicates that the media player is the media player that has been previously associated for synchronization with the host computer,
wherein said computer program code for synchronizing of the media player with the host computer is not automatically performed if said computer program code for comparing of the media player identifier with the synchronized device identifier indicates that the media player has not been previously associated for synchronization with the host computer, and
wherein the media player identifier and the synchronized device identifier serve to associate the media player with the host computer so as to permit subsequent automatic synchronizations between the media player and the host computer.

* * * * *

UNITED STATES PATENT AND TRADEMARK OFFICE
CERTIFICATE OF CORRECTION

PATENT NO.        : 8,626,952 B2                              Page 1 of 1
APPLICATION NO.   : 12/830234
DATED             : January 7, 2014
INVENTOR(S)       : Jeffrey L. Robbin and David Heller It is certified that error appears in the above-identified patent and that said Letters Patent is hereby corrected as shown below:

On the title page item "(45)" should read --*(45)--

On the title page item "Notice", line 3, insert --This patent is subject to a terminal disclaimer.--

Signed and Sealed this
First Day of July, 2014

Michelle K. Lee
*Deputy Director of the United States Patent and Trademark Office*